(12) United States Patent
Chino et al.

(10) Patent No.: US 6,746,562 B2
(45) Date of Patent: Jun. 8, 2004

(54) METHODS OF MAKING AND RECYCLING RUBBER BODIES BONDED WITH A THERMO-REVERSIBLE, CROSSLINKABLE ELASTOMER

(75) Inventors: Keisuke Chino, Kanagawa (JP); Masahiro Ikawa, Kanagawa (JP); Junichiro Natori, Kanagawa (JP)

(73) Assignee: The Yokohama Rubber Co., LTD, Tokyo (JP)

( * ) Notice: Subject to any disclaimer, the term of this patent is extended or adjusted under 35 U.S.C. 154(b) by 0 days.

(21) Appl. No.: 10/664,973

(22) Filed: Sep. 22, 2003

(65) Prior Publication Data

US 2004/0059060 A1 Mar. 25, 2004

Related U.S. Application Data

(62) Division of application No. 09/663,845, filed on Sep. 15, 2000, now abandoned.

(30) Foreign Application Priority Data

| Sep. 16, 1999 | (JP) | 11-262705 |
| Apr. 10, 2000 | (JP) | 2000-107642 |
| Aug. 11, 2000 | (JP) | 2000-244223 |

(51) Int. Cl.$^7$ ................................................. C09J 5/04
(52) U.S. Cl. ..................................................... 156/308.2
(58) Field of Search ............................................ 156/308.2

(56) References Cited

U.S. PATENT DOCUMENTS

| 4,168,982 A | 9/1979 | Pazos |
| 4,647,647 A | 3/1987 | Haubennestel et al. |
| 4,744,852 A * | 5/1988 | Augustin et al. ........... 156/327 |
| 5,914,206 A | 6/1999 | Takasaki et al. |

FOREIGN PATENT DOCUMENTS

| JP | 60-179479 | 9/1985 |
| JP | 06-057062 | 3/1994 |
| WO | WO 99/56864 | 11/1999 |

OTHER PUBLICATIONS

Lee et al., "The Glass Transition Temperatures of Polymers", Polymer Handbook, 2$^{nd}$ ed., Brandrup et al., John Wiley & Sons, New York, pp. 139–142 (1975).

"Standard Test Method for Glass Transition Temperatures by Differential Scanning Calorimetry or Differential Thermal Analysis", ASTM E 1356–91, American Society for Testing & Materials, West.

* cited by examiner

Primary Examiner—D. R. Wilson
(74) Attorney, Agent, or Firm—Rader Fishman & Grauer

(57) ABSTRACT

A thermo-reversible, crosslinkable elastomer, a composition containing the same, a rubber-bonded body and a rubber structure containing the rubber-bonded body are disclosed. The thermo-reversible, crosslinkable elastomer has an elastomer main-chain and a crosslinkable portion having at least one group selected from the group consisting of acid anhydride group and hydroxyl group. The thermo-reversible, crosslinkable elastomer can form stable crosslinked structure at room temperature, thereby having rubber plasticity, show sufficient melt flowability at molding temperature of general thermoplastic resin, and repeatedly reproduce crosslinking formation and crosslinking dissociation.

5 Claims, No Drawings

METHODS OF MAKING AND RECYCLING RUBBER BODIES BONDED WITH A THERMO-REVERSIBLE, CROSSLINKABLE ELASTOMER

This application is a divisional of prior application Ser. No. 09/663,845, filed Sep. 15, 2000 now abandoned.

BACKGROUND OF THE INVENTION

1. Field of the Invention

The present invention relates to a thermo-reversible, crosslinkable elastomer capable of reversibly causing dissociation and formation of a crosslinked structure by temperature change and a composition thereof.

2. Description of the Related Art

Various investigations have previously been made on improvement of recycling property, energy saving property, processability, various properties and the like of elastomers.

In thermoplastic elastomers, physical crosslinking is utilized as compared with conventional vulcanized rubbers having a stable three-dimensional network structure in which polymeric substance and vulcanizing agent are covalent-bonded. The thermoplastic elastomers do not require complicated vulcanization/molding steps including pre-molding, and can easily be molded and processed by heat melting as thermoplastic resins. The thermoplastic elastomer is an improved product in terms of recycling property, energy saving property and processability as compared with conventional elastomers.

Typical example of such a thermoplastic elastomer conventionally known is an elastomer containing a resin component and a rubber component, in which a fine crystal resin component converts to a constraint phase (hard segment) which plays a role of crosslinking site of a three-dimensional network structure, thereby preventing plastic deformation of a rubber component (soft segment), and plastic deformation causes by softening or fusion of the resin component due to temperature elevation. Examples of such a thermoplastic elastomer containing a resin component and a rubber component include block copolymers such as styrene-butadiene block copolymer or isoprene multiblock copolymer, and resin/rubber blends of polypropylene and ethylene-propylene-diene copolymer (EPDM). Further, elastomers in which a rubber component (EPDM) in the resin/rubber blend is crosslinked with a peroxide or the like are also known.

The above-described conventional thermoplastic elastomer contains a resin component to form a constraint phase, and it is unavoidable that rubber elasticity decreases as compared with conventional vulcanized rubber. For this reason, if an elastomer that reversibly secures flowability by temperature change, i.e., an elastomer that crosslinks at room temperature, but has flowability by decrosslinking upon heating, and can reversibly conduct this conversion many times, is developed even if a resin component for forming a constraint phase is not contained, a rubber elastic body can be obtained by simple heat molding and processing without conducting complicated steps of kneading, pre-molding, vulcanization and the like that have conventionally be required, and its industrial utilization value is very high. Further, such an elastomer is very preferable in the point of recycling property.

It is known to utilize various bonding reactions as a modification method of thermoplastic resins.

For example, Japanese Patent Laid-open Application No. Hei 6-57062 proposes a composition comprising a polyolefin graft-modified with unsaturated carboxylic anhydride, and a polyhydric alcohol. It is described therein that the composition can be used by recycling. Japanese Patent Laid-open Application No. Hei 11-106578 also discloses the similar composition.

Further, Japanese Patent Laid-open Application No. Sho 60-179479 proposes an adhesive composition obtained by reacting divinyl ether with a copolymer produced by copolymerization of olefin and ethylenically unsaturated monocarboxylic acid. It is disclosed therein that adhesiveness of the adhesive composition is further improved by thermo-reversibility of crosslinking.

Japanese Patent Laid-open Application No. Hei 11-35675 proposes a resin obtained by addition reaction of a compound having alkenyl ether group and a compound having carboxyl group in the presence of a specific catalyst. It is disclosed therein that the resin has high physical properties and is excellent in recycling property.

Further, a resin utilizing reaction between isocyanate and phenol is disclosed in Angrew. Chem., 59A, 257(1947), a resin utilizing reaction between azlactone and phenol is disclosed in Macromolecules, 24, 6809(1991), and a resin utilizing reaction for forming nitroso dimer is disclosed in U.S. Pat. No. 4,168,882.

Crosslinking formation by reversible reaction in a resin polymer is known as a conventional technique, but it is in general very difficult to introduce such a crosslinked site to an elastomer. It has been also considered that poor reinforcing effect due to the low crystallinity makes it difficult to ensure sufficient strength to resist practical use, even if such a crosslinked site can be introduced. Therefore, an elastomer utilizing each reaction as mentioned above and that can practically be used is not yet known.

Further, Japanese Patent Laid-open Application No. Sho 63-69864 proposes a shape memory resin such that even if an amount of hydrogen bond (crosslinking) is decreased at a temperature higher than a glass transition temperature to deform a shape, the original shape is restored by again cooling to a temperature lower than the glass transition temperature. A resin formed by containing a large amount of hydrogen bond during curing reaction between an epoxy resin and an amine hardener is disclosed as the preferred example.

A method of utilizing hydrogen bond to prevent heat resistance or rigidity from being decreased when a compound having small molecular weight or a thermoplastic resin having large flowability is added as a flowability improver of a resin is proposed as another method. For example, Japanese Patent Laid-open Application No. Hei 5-339420 discloses a method of improving flowability and heat resistance of a thermoplastic resin by adding a compound having hydroxyl group and a compound having a group capable of hydrogen bonding with the hydroxyl group to the thermoplastic resin, and Japanese Patent Laid-open Application No. Hei 7-331002 discloses a method of improving rigidity and flowability of styrenic resin by adding a thermoplastic resin and a compound having a functional group capable of hydrogen bonding with carboxyl group to a styrenic resin having carboxyl group.

It is theoretically known that a thermoplastic elastomer is obtained by utilizing the above-mentioned hydrogen bond for the formation of crosslinking, but practically usable method is not yet known. Hydrogen bond has small bonding energy as compared with covalent bond, and hence decrosslinking tends to occurs by receiving influence of heat or the like. Elastomeric polymer forms a solid state by crosslinking, thereby developing rubber elasticity. Therefore, it is difficult to utilize hydrogen bond for crosslinking mechanism unless crosslinking state is maintained in a stable manner in use.

SUMMARY OF THE INVENTION

An object of the present invention is to provide a thermo-reversible, crosslinkable elastomer capable of reversibly causing crosslinking formation and crosslinking dissociation by temperature change. More particularly, the object of the present invention is to provide a thermo-reversible, crosslinking elastomer which forms a stable crosslinked structure at room temperature, has a rubber elasticity, can sufficiently show a melt flowability at a molding temperature of general thermoplastic resins and can repeatedly reproduce crosslinking formation and crosslinking dissociation.

As a result of intensive studies on thermo-reversible, crosslinkable elastomers, it has been found that a thermo-reversible, crosslinkable elastomer having excellent recycling property and moldability is obtained by utilizing a specific reversible reaction. In other words, it has been found that, by introducing a specific reaction site in an elastomer main-chain, a thermoplastic elastomer forms a thermotropical crosslinked structure, so that crosslinking at room temperature (temperature in use) and decrosslinking-flowability at heating can repeatedly be reproduced, and that the elastomer having the reaction site extremely readily forms a crosslinked structure stable even at a high temperature inevitable in its use, thereby exhibiting rubber properties sufficient to meet requirements of practically usable rubber and, on the other hand, shows excellent flowability at high temperature heating.

It has also found that such a thermo-reversible, crosslinkable elastomer is not required to contain a crystal phase for forming a constrained phase, and it is possible to sufficiently exhibit inherent properties of an elastomer as compared with conventional thermoplastic elastomers.

Further, it has been found that intermolecular or intramolecular interaction by π electron possessed by aromatic rings makes the recycling property of the thermo-reversible, crosslinkable elastomer more excellent. The present invention thus has been completed based on the above findings.

A first aspect of the present invention is thermo-reversible, crosslinkable elastomers shown in (1) to (8) below.

(1) A thermo-reversible, crosslinkable elastomer in which a reaction between acid anhydride group and hydroxyl group is utilized for crosslinking.

The thermo-reversible, crosslinkable elastomer (1) preferably comprises an elastomer main-chain and a crosslinkable portion having at least one group selected from the group consisting of acid anhydride group and hydroxyl group.

(2) A thermo-reversible, crosslinkable elastomer in which a reaction between carboxyl group and vinyl ether group is utilized for crosslinking.

The thermo-reversible, crosslinkable elastomer (2) preferably comprises an elastomer main-chain and a crosslinkable portion having at least one group selected from the group consisting of carboxyl group and vinyl ether group.

(3) A thermo-reversible, crosslinkable elastomer in which a reaction between halogenated alkyl group and tertiary amino group is utilized for crosslinking.

The thermo-reversible, crosslinkable elastomer (3) preferably comprises an elastomer main-chain and a crosslinkable portion having at least one group selected from the group consisting of halogenated alkyl group and tertiary amino group.

(4) A thermo-reversible, crosslinkable elastomer in which a reaction between isocyanate group and phenolic hydroxyl group is utilized for crosslinking.

The thermo-reversible, crosslinkable elastomer (4) preferably comprises an elastomer main-chain and a crosslinkable portion having at least one group selected from the group consisting of isocyanate group and phenolic hydroxyl group.

(5) A thermo-reversible, crosslinkable elastomer in which a reaction between azlactone group and phenolic hydroxyl group is utilized for crosslinking.

The thermo-reversible, crosslinkable elastomer (5) preferably comprises an elastomer main-chain and a crosslinkable portion having at least one group selected from the group consisting of azlactone group and phenolic hydroxyl group.

(6) A thermo-reversible, crosslinkable elastomer in which a dimerization reaction of nitroso group is utilized for crosslinking.

The thermo-reversible, crosslinkable elastomer (6) preferably comprises an elastomer main-chain and a crosslinkable portion having nitroso group.

(7) A thermo-reversible, crosslinkable elastomer in which a reaction, preferably hydrogen bond between nitrogen-containing heterocycles is utilized for crosslinking.

The thermo-reversible, crosslinkable elastomer (7) preferably comprises an elastomer main-chain and a crosslinkable portion formed of nitrogen-containing heterocycles.

(8) A thermo-reversible, crosslinkable elastomer having, as side chains, at least two members selected from the group consisting of an aromatic ring having a substituent in which a substituent constant σ of Hammett's rule has a positive value, an aromatic ring having a substituent in which the σ has a negative value, an unsubstituted aromatic ring in which the σ is 0, and a nitrogen-containing heterocycle.

It is preferable for the thermo-reversible, crosslinkable elastomer (8) to have, as side chains, at least two members selected from the group consisting of an aromatic ring having a substituent in which the σ has a positive value, an aromatic ring having a substituent in which the σ has a negative value, and a nitrogen-containing heterocycle.

The substituent in which the σ has a positive value is preferably at least one member selected from the group consisting of halogen group, phenyl group, cyano group, nitro group, acetyl group and carboxyl group.

The substituent in which the σ has a negative value is preferably at least one member selected from the group consisting of alkyl group, methoxy group, phenoxy group, hydroxyl group and amino group.

It is preferable for the thermo-reversible, crosslinkable elastomer (8) to have, as side chains, an aromatic ring having a substituent in which the σ has a positive value and an aromatic ring having a substituent in which the σ has a negative value.

It is also preferable for the thermo-reversible, crosslinkable elastomer (8) to have, as side chains, an aromatic ring having a substituent in which the σ has a positive value and a nitrogen-containing heterocycle.

Further, it is preferable for the thermo-reversible, crosslinkable elastomer (8) to further have a carbonyl-containing group, as a side chain.

It is preferable for the thermo-reversible, each of the crosslinkable elastomers (1)–(8) to have at least one glass transition temperature of not more than 25° C.

A second aspect of the present invention is a rubber composition containing at least one of the above thermo-reversible, crosslinkable elastomers.

It is preferable for the rubber composition according to the second aspect of the present invention to further contain an elastomer other than the above thermo-reversible, crosslinkable elastomers.

A third aspect of the present invention is a rubber-bonded body comprising a layer containing the composition according to the second aspect and a layer containing a vulcanized rubber composition, bonded to the former layer.

It is preferable that elastomer main-chains in the layer containing the composition according to the second aspect and the layer containing the vulcanized rubber composition have repeating units formed of at least one identical monomer component.

A fourth aspect of the present invention is a rubber structure having the rubber-bonded body in at least a part thereof.

DETAILED DESCRIPTION OF THE PREFERRED EMBODIMENTS

Each of the aspects of the present invention will be described in detail below.

The following is a description of a thermo-reversible, crosslinkable elastomer according to the first aspect of the present invention.

An elastomeric polymer constituting the main-chain in the present invention is generally a conventional natural polymer or synthetic polymer known as rubber elastic materials for vulcanization (crosslinking and curing) and preferably at least one glass transition temperature of the rubber elastic material is not more than room temperature (25° C., more preferably 10° C.). Examples of such an elastomeric polymer include ordinary rubbers (including liquid rubbers), thermoplastic elastomers, thermosetting elastomers and saturated hydrocarbon polymers.

Using the above-described elastomeric polymer, the present thermo-reversible, crosslinkable elastomer of the invention has at least one glass transition temperature being not more than 25° C. (more preferably 10° C.).

Specifically, examples of the ordinary rubber include isoprene rubber, butadiene rubber, 1,2-polybutadiene rubber, styrene-butadiene rubber, chloroprene rubber, nitrile rubber, butyl rubber, halogenated butyl rubber (e.g., chlorinated butyl rubber (Cl-IIR), brominated butyl rubber (Br-IIR)), ethylene-propylene rubber (EPM, EPT), ethylene-propylene-diene rubber (EPDM), chlorosulfonated polyethylene, acrylic rubber, epichlorohydrin rubber, polysulfide rubber, silicone rubber, fluorine rubber, urethane rubber, copolymers of isobutylene and aromatic vinyl or diene monomer, and its bromidated rubbers (e.g., isobutylene-p-bromomethylstyrene copolymer).

Examples of the thermoplastic elastomer include polystyrene type thermoplastic elastomer (e.g., styrene-butadiene-styrene block copolymer (SBR), styrene-isoprene-styrene block copolymer (SIS), or hydrogenated product of styrene-butylene-styrene block copolymer (SEBS)), polyolefin type thermoplastic elastomer, polyurethane type thermoplastic elastomer, polyester type thermoplastic elastomer, polyamide type thermoplastic elastomer, and polyvinyl chloride type thermoplastic elastomer.

Examples of the thermosetting elastomer include urethane type thermosetting elastomer and silicone type thermosetting elastomer.

Examples of a polyol compound used in the polyurethane type elastomer include polyether polyol, polyester polyol, other polyols, and mixed polyols of these.

Examples of the polyether polyol include polyether polyols obtained by adding one or more of propylene oxide, ethylene oxide, butylene oxide, styrene oxide and the like to one or more of polyhydric alcohols such as ethylene glycol, diethylene glycol, propylene glycol, dipropylene glycol, glycerin, 1,1,1-trimethylol propane, 1,2,5-hexanetriol, 1,3-butanediol, 1,4-butanediol, 4,4'-dihydroxyphenyl propane, 4,4'-dihydroxyphenyl methane or pentaerythritol; and polyoxytetramethylene oxide. Specific examples thereof include polypropylene glycol, polyoxypropylene glycol, polytetramethylene glycol, polyethylene glycol and polyoxypropylene triol.

Examples of the saturated hydrocarbon polymer include isobutylene polymer and hydrogenated polybutadiene polymer.

The above-described elastomeric polymers may be liquid or solid, and a molecular weight thereof is not particularly limited. These elastomeric polymers can appropriately be selected according to the purpose of use, crosslinking density and the like. A liquid rubber is preferable in the case where convenience in producing the thermoplastic elastomer and flowability in heating (decrosslinking) are preferentially considered. Further, a molecular weight at which the polymer takes liquid state is preferable. For example, in the case of a diene rubber such as isoprene rubber or butadiene rubber, its weight average molecular weight is preferably about 1,000 to 100,000, more preferably 10,000 to 100,000. On the other hand, a solid rubber is preferable in the case where strength of a rubber is preferentially considered, and its weight average molecular weight is preferably about 100,000 to 2,000,000, more preferably 300,000 to 1,000,000.

Among the above-described elastomeric polymers used in the present invention, copolymers of isobutylene and aromatic vinyl or diene monomer, and their brominated polymers (particularly, isobutylene-p-bromomethylstyrene copolymer), halogenated butyl rubbers (particularly, brominated butyl rubber), polybutene and polyisobutylene are preferably used from the standpoints of heat resistance, weather resistance and resistance to gas permeability. Further, polyurethane (urethane rubber) and polyisoprene (isoprene rubber) are preferable from the standpoint of cost.

Stating materials for polyurethane are preferably polypropylene glycol and polytetramethylene glycol, and among those, compounds having at least two terminal hydroxyl groups are preferable.

The thermo-reversible, crosslinkable elastomers (1) to (8) of the present invention are compounds capable of thermoreversibly causing crosslinking formation and crosslinking dissociation by temperature change. Among those, the thermo-reversible, crosslinking elastomers (1) to (6) exhibit a thermo-reversible crosslinkability by utilizing reaction caused between specific reaction sites. The thermo-reversible, crosslinkable elastomer (7) has a thermo-reversible crosslinkability by utilizing hydrogen bond formed between nitrogen-containing heterocycles introduced in the elastomer main-chain. The thermo-reversible, crosslinkable elastomer (8) exhibits a thermo-reversible crosslinkability by utilizing π bond formed between specific aromatic rings introduced in the elastic main chain.

The thermo-reversible, crosslinkable elastomers (1) to (6) will be explained below.

The thermo-reversible, crosslinkable elastomers (1) to (6) have a specific reaction site and a crosslinkable moiety (reaction site) capable of thermoreversibly causing crosslinking formation and crosslinking dissociation by temperature change. Thermo-reversible reaction of the thermo-reversible, crosslinkable elastomers (1) to (6) will be explained below by generalizing it down to a thermo-reversible reaction between reaction sites A and B.

The thermo-reversible, crosslinkable elastomer of the present invention forms crosslinking at room temperature by crosslinking reaction between reaction sites A and B. The crosslinking is dissociated when heated to a certain temperature or more. When cooled, the crosslinking is again formed.

The thermo-reversible, crosslinkable elastomers (1) to (6) take any one of the following forms.

(a) An elastomer having either or both of reaction sites A and B in which the reaction sites A and B are reacted intermolecular to bond form, and crosslinking is formed at room temperature (in the thermo-reversible, crosslinkable elastomer (6), since reaction sites A and B are the same, the elastomer has nitroso group; nitroso groups are reacted with each other to bond form, whereby crosslinking is formed at room temperature).

(b) An elastomer including an elastomer molecule having at least one of reaction sites A and B and a compound having at least the other reaction site in which the reaction sites A and B are reacted to bond between the elastomer chains and the compound, and crosslinking is formed at room temperature. The compound having at least the other reaction site usually has two other reaction sites at its molecule. In the thermo-reversible, crosslinkable elastomer (6), since reaction sites A and B are the same, the elastomer has an elastomer chain having nitroso group and a compound having nitroso group; nitroso groups are reacted with each other to bond the elastomer chain and the compound, whereby crosslinking is formed at room temperature.

The thermo-reversible, crosslinkable elastomers (1) to (6) have a crosslinked structure at room temperature. Therefore, the elastomer is present in the state that bonds are formed between the elastomer molecules in the form (a), and the elastomer is present in the state that the elastomer molecule and the compound are bonded in the form (b). However, since the crosslinked structure dissociates at a certain temperature or higher, the elastomer is present in the state that the elastomer molecules are separated from each other in the form (a), and the elastomer is present in the state that the elastomer molecule and the compound are separated from each other in the form (b).

In the form (a), one elastomer molecule may have both of reaction site's A and B, and an elastomer having only reaction site A in its chain and an elastomer having only reaction site B in its chain may be mixed. In particular, it is preferable to have both reaction sites A and B in its chain.

Further, an elastomer having both reaction sites A and B in its chain and at least one of an elastomer having only reaction site A in its chain and an elastomer having only reaction site B in its chain may be mixed.

In the form (b), the reaction site present in its chain may be reaction site A or reaction site B. In the case where the elastomer has reaction site A, the compound has reaction site B, and in the case where the elastomer has reaction site B, the compound has reaction site A. In the case where the elastomer molecule has reaction sites A and B, the compound may have one or both of reaction sites A and B.

In the thermo-reversible, crosslinkable elastomer (1), reaction sites A and B are acid anhydride group and hydroxyl group. The acid anhydride group means an acid anhydride group of aliphatic or aromatic carboxylic acids, and any of cyclic acid anhydride group and non-cyclic acid anhydride group can be used. In particular, cyclic acid anhydride group is preferably used. Examples of the cyclic acid anhydride group include maleic anhydride group, phthalic anhydride group, succinic anhydride group and glutaric anhydride group. Examples of the non-cyclic acid anhydride group include acetic anhydride group, propionic anhydride group and benzoic anhydride group. Among those, succinic anhydride group formed by addition reaction with maleic anhydride is preferable.

In the thermo-reversible, crosslinkable elastomer (2), reaction sites A and B are carboxyl group and vinyl ether group.

In the thermo-reversible, crosslinkable elastomer (3), reaction sites A and B are halogenated alkyl group and tertiary amino group. Examples of the halogenated alkyl group include alkyl bromide, alkyl chloride, phenyl bromide, phenyl chloride, benzyl bromide and benzyl chloride. Among those, benzyl bromide is preferable. Examples of the tertiary amino group include dimethylamino group, diethylamino group and diphenylamino group. Among those, dimethylamino group is preferable. The combination of the halogenated alkyl group and the tertiary amino group is not particularly limited, but a combination of benzyl bromide and dimethylamino group is preferable.

In the thermo-reversible, crosslinkable elastomer (4), reaction sites A and B are phenolic hydroxyl group and isocyanate group.

In the thermo-reversible, crosslinkable elastomer (5), reaction sites A and B are azlactone group and phenolic hydroxyl group.

In the thermo-reversible, crosslinkable elastomer (6), reaction sites A and B are the same and are nitroso group.

The thermo-reversible, crosslinkable elastomer of the form (a) may be obtained by modifying the elastomeric polymer as a raw material in the state that reaction sites A and B have already been reacted, or by directly polymerizing in the state that reaction sites A and B have already been reacted. Alternatively, it can be obtained by applying an action, such as heating or cooling, to an elastomer obtained by modifying a raw material elastomer so as to have both reaction sites A and B, or an elastomer obtained by polymerizing so as to have both reaction sites A and B.

In the thermo-reversible, crosslinkable elastomer of the form (b), an elastomer forming crosslinkage with a compound is obtained by modifying an elastomeric polymer so as to have at least one of reaction sites A and B, or by polymerizing so as to have at least one of reaction sites A and B, and is also obtained by polymerizing or modifying in the state that reaction sites A and B have been reacted.

A process of producing an elastomer having both reaction sites A and B of the form (a) is not particularly limited, and such an elastomer is produced by a process comprising introducing reaction sites A and B simultaneously in the state of reaction or separately. A method of introducing reaction site A in an elastomeric polymer and a method of introducing reaction site B in an elastomeric polymer will specifically be explained below.

A process of producing an elastomer having at least one of reaction sites A and B of the form (b) is not particularly limited, and such an elastomer is produced using a method of introducing reaction site A in an elastomeric polymer, and a method of introducing reaction site B in an elastomeric polymer, or a method of introducing reaction sites A and B in an elastomeric polymer in the state that they have been reacted.

A method of introducing an acid anhydride group in an elastomeric polymer and a method of introducing hydroxyl group in an elastomeric polymer, used in the thermo-reversible, crosslinkable elastomer (1) will be explained below.

Examples of the method of introducing an acid anhydride group in an elastomeric polymer include method of copolymerizing an olefin-containing acid anhydride monomer such as maleic anhydride and a method of reacting an acid anhydride skeleton-containing compound with an elastomeric polymer, specifically a method of reacting maleic anhydride with a diene rubber.

Examples of the method of introducing hydroxyl group in an elastomeric polymer include a method of copolymerizing a monomer such as vinyl acetate, and then conducting hydrolysis, and a method of reacting a hydroxyl group-containing compound with an elastomeric polymer, specifically a method of reacting a hydroxyl group-containing mercapto compound such as mercaptoethanol with a diene rubber.

Examples of the method of introducing reaction sites A and B in an elastomeric polymer in the state that they have been reacted include a method of introducing a compound having a half ester skeleton in which an acid anhydride skeleton and hydroxyl group have been reacted, by a polymer reaction, and a method of copolymerizing the same.

A method of introducing carboxyl group in an elastomeric polymer and a method of introducing vinyl ether group in an elastomeric polymer, used in the thermo-reversible, crosslinkable elastomer (2) will be explained below.

Examples of the method of introducing carboxyl group in an elastomeric polymer include a method of copolymerizing a carboxyl group-containing monomer such as acrylic acid or methacrylic acid, and a method of reacting a carboxyl group-containing compound with an elastomeric polymer, specifically a method of reacting a carboxylic acid-containing mercapto compound such as thioglycolic acid with a diene rubber.

Examples of the method of introducing vinyl ether group in an elastomeric polymer include a method of copolymerizing a vinyl ether group-containing monomer such as divinyl ether, and a method of reacting a vinyl ether group-containing compound with an elastomeric polymer, specifically a method of reacting a vinyl ether-containing mercapto compound such as mercaptoethylvinyl ether with a diene rubber.

Examples of the method of introducing reaction sites A and B in an elastomeric polymer in the state that they have been reacted include a method of introducing, through a polymer reaction, a compound having hemiacetal ester skeleton in which carboxyl group and vinyl ether group have been reacted and a method of copolymerizing the same.

A method of introducing halogenated alkyl group in an elastomeric polymer and a method of introducing tertiary amino group in an elastomeric polymer, used in the thermo-reversible, crosslinkable elastomer (3) will be explained below.

Examples of the method of introducing halogenated alkyl group in an elastomeric polymer include a method of copolymerizing a halogenated alkyl group-containing monomer such as bromomethylstyrene or chloromethylstyrene, and a method of reacting a halogenated alkyl group-containing compound such as mercaptobromotoluene or mercaptochlorotoluene with an elastomeric polymer.

Examples of the method of introducing tertiary amino group in an elastomeric polymer include a method of copolymerizinq a tertiary amino group-containing monomer such as dimethylaminostyrene or diethylaminostyrene, and a method of reacting a tertiary amino group-containing compound such as dimethylaminothiophenol or diethylaminothiophenol with an elastomeric polymer.

Examples of the method of introducing reaction sites A and B in an elastomeric polymer in the state that they have been reacted include a method of introducing, through a polymer reaction, a compound having an ionene skeleton in which a halogenated alkyl group and a tertiary amino group have been reacted and a method of copolymerizing the same.

A method of introducing phenolic hydroxyl group in an elastomeric polymer and a method of introducing isocyanate group in an elastomeric polymer, used in the thermo-reversible, crosslinkable elastomer (4) will be explained below.

Examples of the method of introducing phenolic hydroxyl group in an elastomeric polymer include a method of copolymerizing a phenolic hydroxyl group-containing monomer such as hydroxystyrene, and a method of reacting a phenolic hydroxyl group-containing compound such as mercaptophenol with an elastomeric polymer.

Examples of the method of introducing isocyanate group in an elastomeric polymer include a method of copolymerizing an isocyanate group-containing monomer such as isocyanate styrene or isocyanate acrylate, and a method of reacting a compound having a protected isocyanate group, such as phenol-capped isocyanate thiophenol, with an elastomeric polymer and then removing a blocking group.

Examples of the method of introducing reaction sites A and B in an elastomeric polymer in the state that they have been reacted include a method of introducing, through a polymer reaction, a compound having a urethane skeleton in which isocyanate group and phenolic hydroxyl group have been reacted, and a method of copolymerizing the same.

A method of introducing azlactone group in an elastomeric polymer and a method of introducing phenolic hydroxyl group in an elastomeric polymer, used in the thermo-reversible, crosslinkable elastomer (5) will be explained below.

Examples of the method of introducing azlactone group in an elastomeric polymer include a method of copolymerizing an azlactone group-containing monomer such as azlactone styrene, azlactone acrylate or alkenyl azlactone, and a method of reacting an azlactone group-containing compound such as azlactone thiophenol with an elastomeric polymer.

The method of introducing a phenolic hydroxyl group in an elastomeric polymer is the same as used in the thermo-reversible, crosslinkable elastomer (4).

Examples of the method of introducing reaction sites A and B in an elastomeric polymer in the state that they have been reacted include a method of introducing, through a polymer reaction, a compound having a skeleton in which azlactone group and phenolic hydroxyl group have been reacted, and a method of copolymerizing the same.

A method of introducing nitroso group in an elastomer, used in the thermo-reversible, crosslinkable elastomer (6) will be explained below.

Examples of the method of introducing nitroso group in an elastomer include a method of copolymerizing a nitroso group-containing monomer such as nitrosostyrene or nitrosoacrylate, and a method of reacting a nitroso group-containing compound such as nitrosothiophenol or nitrosyl chloride with an elastomeric polymer.

Examples of the method of introducing in an elastomeric polymer in the state that nitroso group has been reacted include a method of introducing, through a polymer reaction, a compound having a skeleton in which nitroso group has been dimerized, and a method of copolymerizing the same.

The number of reaction site A and/or reaction site B included in the molecule of the compound used in the form (b) is preferably at least two since the compound had to crosslink with elastomer molecules, but a compound having one reaction site A or B in the molecule may be permitted to be mixed therewith.

In the thermo-reversible, crosslinkable elastomer (1), the compound used in the form (b) is a compound having acid anhydride group, a compound having hydroxyl group or a compound having acid anhydride group and hydroxyl group.

Examples of the compound having acid anhydride group include bisphthalic anhydride compound, bissuccinic anhydride compound, bisglutaric anhydride compound and bismaleic anhydride compound.

Examples of the compound having hydroxyl group include glycols such as ethylene glycol, diethylene glycol or triethylene glycol; and alcohol compounds such as 1,4-butanediol, 1,6-hexanediol, 1,8-octanediol, 1,10-decanediol, trimethylol ethane, trimethylol propane or pentaerythritol.

Among those, 1,6-hexanediol, ethylene glycol and diethylene glycol are preferable.

Examples of the compound having acid anhydride group and hydroxyl group include hydroxyl group-containing phthalic anhydride, hydroxyl group-containing succinic anhydride, hydroxyl group-containing glutaric anhydride and hydroxyl group-containing maleic anhydride.

In the thermo-reversible, crosslinkable elastomer (2), the compound used in the form (b) is a compound having carboxyl group, a compound having vinyl ether group or a compound having carboxyl group and vinyl ether group.

Examples of the compound having carboxyl group include oxalic acid, malonic acid, succinic acid, glutaric acid, adipic acid, phthalic acid, maleic acid and fumaric acid.

Examples of the compound having vinyl ether group include ethylene glycol divinyl ether, butanediol divinyl ether and 2,2-bis[p-(2-vinyloxyethoxy)phenyl]propane. Among those, ethylene glycol divinyl ether and butanediol divinyl ether are preferable.

Examples of the compound having carboxyl group and vinyl ether group include carboxyl group-containing methyl vinyl ether, carboxyl group-containing ethyl vinyl ether and carboxyl group-containing propyl vinyl ether.

In the thermo-reversible, crosslinkable elastomer (3), the compound used in the form (b) is a compound having a halogenated alkyl group, a compound having a tertiary amino group or a compound having a halogenated alkyl group and a tertiary amino group.

Examples of the compound having a halogenated alkyl group include α,α'-dibromoxylene, α,α'-dichloroxylene, bisbromomethylbiphenyl, bischloromethylbiphenyl, bisbromodiphenylmethane, bischlorodiphenylmethane, bisbromomethylbenzophenone, bischlromethylbenzophenone, bisbromodiphenylpropane and bischlorodiphenylpropane.

Examples of the compound having a tertiary amino group include tetramethylethylene diamine, tetramethylhexane diamine and bisdimethylaminobenzene. Among those, tetramethylhexane diamine is preferable.

Examples of the compound having a halogenated alkyl group and a tertiary amino group include bromoethyl dimethylamine, chloroethyl dimethylamine, bromophenyl dimethylamine, bromomethylphenyl dimethylamine, bromoxylyl dimethylamine and bromopropyl dimethylamine.

In the thermo-reversible, crosslinkable elastomer (4), the compound used in the form (b) is a compound having phenolic hydroxyl group, a compound having isocyanate group or a compound having phenolic hydroxyl group and isocyanate group.

Examples of the compound having phenolic hydroxyl group include dihydroxybenzene, dihydroxybiphenyl, resol type phenolic resin and novolak type phenolic resin.

Examples of the compound having isocyanate group include aromatic diisocyanates such as 2,4-tolylene diisocyanate, 2,6-tolylene diisocyanate, 4,4'-diphenylmethane diisocyanate, 2,4'-diphenylmethane diisocyanate or p-phenylene diisocyanate; aliphatic diisocyanates such as hexamethylene diisocyanate; alicyclic diisocyanates such as isophorone diisocyanate; and aryl aliphatic diisocyanates such as xylylene diisocyanate.

Examples of the compound having phenolic hydroxyl group and isocyanate group include hydroxyphenyl isocyanate, hydroxytoluyl isocyanate, hydroxydiphenyl isocyanate and hydroxydiphenylmethane isocyanate.

In the thermo-reversible, crosslinkable elastomer (5), the compound used in the form (b) is a compound having azlactone group, a compound having phenolic hydroxyl group or a compound having azlactone group and phenolic hydroxyl group.

Examples of the compound having azlactone group include bisazlactone butane, bisazlactone benzene and bisazlactone hexane.

Examples of the compound having phenolic hydroxyl group include the same compounds as used in the thermo-reversible, crosslinkable elastomer (4).

Examples of the compound having azlactone group and phenolic hydroxyl group include hydroxyphenyl azlactone, hydroxytoluyl azlactone, hydroxydiphenyl azlactone and hydroxydipheylmethane azlactone.

As mentioned above, intramolecular or intermolecular reaction may take place between reaction sites A and B in the compound including these sites. It is more preferable from the standpoint of stability that intramolecular reaction or intermolecular reaction takes place between reaction sites A and B, if intramolecular or intermolecular reverse reaction of reaction sites A and B that took place in the compound upon reaction with the elastomeric polymer is involved in crosslinking reaction.

In the thermo-reversible, crosslinkable elastomer (6), the compound used in the form (b) is a compound having nitroso group.

Examples of the compound having nitroso group include dinitrosopropane, dinitrosohexane, dinitrosobenzene and dinitrosotoluene.

In the form (b), the combination of an elastomer having at least one of reaction sites A and B and a compound having at least the other reaction site is not particularly limited, but in the thermo-reversible, crosslinkable elastomer (1), a combination in which the elastomer is maleic anhydride group-containing diene rubber and the compound is an aliphatic diol such as 1,6-hexanediol is preferable.

In the thermo-reversible, crosslinkable elastomer (2), a combination in which the elastomer is a carboxyl group-containing diene rubber and the compound is divinyl ether of alkyl diol, such as butanediol divinyl ether, is preferable.

In the thermo-reversible, crosslinkable elastomer (3), a combination in which the elastomer is a halogenated alkyl-containing diene rubber and the compound is an alkyl diamine such as tetramethylhexane diamine is preferable.

In the thermo-reversible, crosslinkable elastomer (4), a combination in which the elastomer or a phenolic hydroxyl group-containing diene rubber and the compound is an aromatic diisocyanate such as diphenylmethane diisocyanate is preferable.

In the thermo-reversible, crosslinkable elastomer (5), a combination in which the elastomer is a phenolic hydroxyl group-containing diene rubber and the compound is alkyl bisazlactone such as bisazlactone butane is preferable.

In the thermo-reversible, crosslinkable elastomer (6), the elastomer is preferably a nitroso group-containing diene rubber alone.

In the form (a), the amount of a crosslinking site in the elastomer, i.e., the amount of the bonded portion caused by the reaction of reaction sites A and B in the elastomer, is preferably 0.1 mol % or more per mole of the monomer unit in the elastomer. Within this range, the thermo-reversible, crosslinkable elastomers (1) to (6) have excellent strength and the like.

In the form (b), the amount of a crosslinking site in the elastomer, i.e., the amount of the bonded portion caused by the reaction of at least one of reaction sites A and B in the elastomer with at least the other reaction site in the compound, is preferably 0.1 mol % or more per mole of the monomer unit in the elastomer. Within this range, the thermo-reversible, crosslinkable elastomers (1) to (6) have excellent strength and the like.

In the form (b), the ratio between the elastomer having at least one of reaction sites A and B and the compound having at least the other is such that the reaction site in the compound is preferably 0.1 to 5 equivalents, more preferably 0.5 to 1.5 equivalents, per equivalent of the reaction site in the elastomer. Within the above range, the reaction site participating in crosslinking increases, crosslinking efficiency increases.

Processes of producing the thermo-reversible, crosslinkable elastomers (1) to (6) are not particularly limited, and, for example, solution mixing process, dry mixing process can be used. The solution mixing process is a method comprising conducting crosslinking reaction in a soluble solvent and then distilling off the solvent. The dry mixing process is a method comprising conducting mixing and crosslinking reaction in a kneader or the like without using a solvent.

In the production of each of the thermo-reversible, crosslinkable elastomers (1) to (6), either process of the solution mixing method or the dry mixing process can be used. In all cases, the reaction temperature is 50° C. or more.

In the case where the thermo-reversible, crosslinkable elastomers (1) to (6) are in the form (a), one or more of elastomers having both reaction sites A and B can be used to produce the same.

In the case where the thermo-reversible, crosslinkable elastomers (1) to (6) are in the form (b), one or more of elastomers having at least one of reaction sites A and B can be used and one or more of compounds having at least the other reaction site can be used, to produce the same.

The thermo-reversible, crosslinkable elastomers (1) to (6) of the present invention is such that reaction sites A and B are reacted to bond between the elastomer chains or between the elastomer and the compound, and crosslinking is formed at room temperature. If the thermo-reversible, crosslinkable elastomers (1) to (6) are heated to a certain temperature or higher, the bonding dissociates, thereby disintegrating the crosslinking.

In the thermo-reversible, crosslinkable elastomer (1), acid anhydride group and hydroxyl group form an ester, thereby forming crosslinking. Decrosslinking and recrosslinking (regeneration) of this crosslinking is shown in the following formula (1). Temperature at which decrosslinking and recrosslinking occur (fluidization initiation temperature) is generally about 100 to 250° C., although it may vary depending on the crosslinking density or the like.

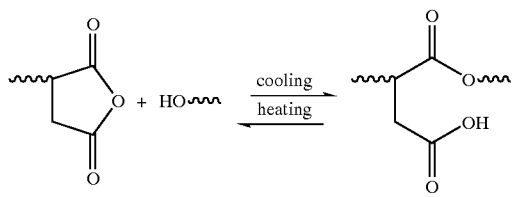
(1)

In the thermo-reversible, crosslinkable elastomer (2), carboxyl group and vinyl ether group form hemiacetal ester, thereby forming crosslinkage. Decrosslinking and recrosslinking (regeneration) of this crosslinkage is shown in the following formula (2). Temperature at which decrosslinking and recrosslinking occur (fluidization initiation temperature) is generally about 100 to 250° C., although it may vary depending on the crosslinking density or the like.

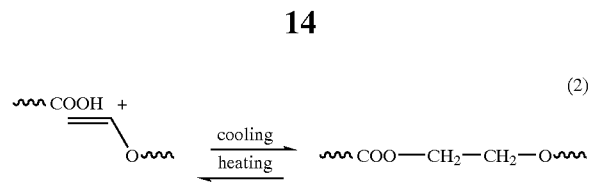
(2)

In the thermo-reversible, crosslinkable elastomer (3), halogenated-alkyl group and tertiary amine form ionene, thereby forming crosslinking. Decrosslinking and recrosslinking (regeneration) of this crosslinking is shown in the following formula (3). Temperature at which decrosslinking and recrosslinking occur (fluidization initiation temperature) is generally about 100 to 250° C., although it may vary depending on the crosslinking density or the like.

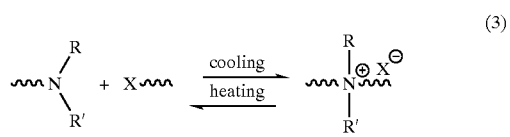
(3)

In the thermo-reversible, crosslinkable elastomer (4), phenolic hydroxyl group and isocyanate group form urethane, thereby forming crosslinking. Decrosslinking and recrosslinking (regeneration) of this crosslinking is shown in the following formula (4). Temperature at which decrosslinking and recrosslinking occur (fluidization initiation temperature) is generally about 100 to 250° C., although it may vary depending on the crosslinking density or the like.

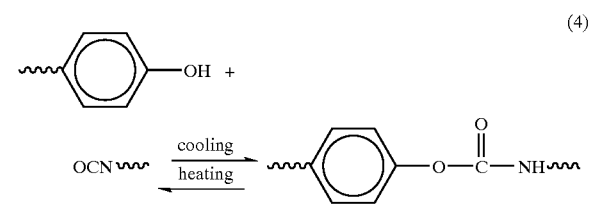
(4)

In the thermo-reversible, crosslinkable elastomer (5), azlactone group and phenolic hydroxyl group form bonding, thereby forming crosslinking. Decrosslinking and recrosslinking (regeneration) of this crosslinking is shown in the following formula (5). Temperature at which decrosslinking and recrosslinking occur (fluidization initiation temperature) is generally about 100 to 250° C., although it may vary depending on the crosslinking density or the like.

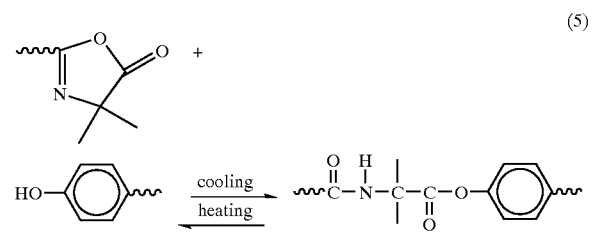
(5)

In the thermo-reversible, crosslinkable elastomer (6), two nitroso groups form nitroso dimer, thereby forming crosslinking. Decrosslinking and recrosslinking (regeneration) of this crosslinking is shown in the following formula (6). Temperature at which decrosslinking and recrosslinking occur (fluidization initiation temperature) is generally about 100 to 250° C., although it may vary depending on the crosslinking density or the like.

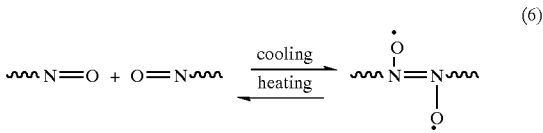

(6)

The thermo-reversible, crosslinkable elastomers (1) to (6) show a rubber elasticity because of formation of crosslinking at room temperature. When the elastomers are heated to a certain temperature or higher (processing temperature; generally 50° C. or higher), crosslinking dissociates. As a result, the elastomers show flowability, have excellent heat aging resistance and can continuously melt molded in a stable manner for a long period of time. Crosslinked structure is rapidly formed in cooling step after molding. When again heated to the processing temperature or higher, crosslinking completely dissociates, and when again cooled, crosslinkage is formed.

The thermo-reversible, crosslinkable elastomers (1) to (6) can repeatedly conduct dissociation and formation of this crosslinked structure three times or more.

Therefore, the thermo-reversible, crosslinkable elastomers (1) to (6) of the present invention have excellent rubber elasticity, and heat molding and recycling thereof are easy.

The thermo-reversible, crosslinkable elastomer (7) will be explained below.

The thermo-reversible, crosslinkable elastomer (7) has nitrogen-containing heterocycles in the chain, and at least one heterocycle is capable of forming hydrogen bond between the same and the other nitrogen-containing heterocycle. In other words, the thermo-reversible, crosslinkable elastomer (7) of the present invention does not require a help of other compound and has at least one nitrogen-containing heterocycle capable of forming hydrogen bond between only two nitrogen-containing heterocycles.

It is the most preferable for such a nitrogen-containing heterocycle to be a ring having hydrogen bond by itself, i.e., a ring having both a donor type hydrogen (hereafter referred to as a "donor" for simplicity) and an acceptor type hetero atom (such as nitrogen or oxygen) (hereinafter referred to as an "acceptor" for simplicity).

Further, the nitrogen-containing heterocycle capable of forming hydrogen bond possessed by the thermo-reversible, crosslinkable elastomer (7) may be a ring having only a donor or a ring having only an acceptor. The ring having only a donor can form hydrogen bond by co-using a ring having only an acceptor or a ring having a donor and an acceptor. The ring having only an acceptor can form hydrogen bond by co-using a ring having only a donor or a ring having a donor and an acceptor.

The thermo-reversible, crosslinkable elastomer (7) may have (1) only a ring having both a donor and an acceptor, (2) one or both of a ring having only a donor and a ring having only an acceptor in addition of a ring having both a donor and an acceptor, or (3) both of a ring having only a donor and a ring having only an acceptor, without having a ring having both a donor and an acceptor.

The present invention can introduce a nitrogen-containing heterocycle in an elastomeric polymer by the use of a compound having a nitrogen-containing heterocyclic ring.

Examples of the ring having both a donor and an acceptor include pyrroline, pyrrolidone, oxyindole(2-oxyindole), indoxyl(3-oxyindole), dioxyindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrine, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine and cinnoline.

Examples of the ring having only a donor generally include pyrrole, pyrroline, indole, indoline, oxyindole, carbazole and phenothiazine.

Examples of the ring having only an acceptor generally include indolenine, isoindole, oxazoles, thiazoles, isoxazoles, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzisoxazole, anthranil, benzothiazole, benzofurazane, pyridine, quinoline, isoquinoline, acridine, phenanthridine, anthrazoline, naphthyridine, thiazine, pyridazine, pyrimidine, quinazoline, quinoxaline and triazine.

The compound having a nitrogen-containing heterocycle is not particularly limited so long as it contains the above-described heterocycle. For example, the compound may have a group capable of chemically (covalent) bonding with a main-chain carbon of the elastomeric polymer. Examples of the group include amino group, hydroxyl group, methylene group, ethylene group, carboxylic group and mercapto group.

Examples of the compound having such a nitrogen-containing heterocycle include dipyridylamine, 1,2-dimethylimidazole, 2-benzimidazoleurea, pyrrole-2-carboxylic acid, 3-methyl-pyrazole, 4 (or 2)-hydroxymethylpyridine, 2 (or 4)-(β-hydroxyethyl)-pyridine, 2 (or 4)-(2-aminoethyl)-pyridine, 2 (or 4)-aminopyridine, 2,6-diaminopyridine, 2-amino-6-hydroxypyridine, 6-azathymine, acetoguanamine, benzoguanamine, citrazinic acid, 1,2,4-triazole, 3-amino-1,2,4-triazole, 3-aminomethyl-1,2,4-triazole, 3-methylamino-1,2,4-triazole, 3-methylol-1,2,4-triazole, 3-hydroxy-1,2,4-triazole, 2-hydroxytriazine, 2-aminotriazine, 2-hydroxy-5-methyltriazine, 2-amino-5-methyltriazine, 2-hydroxypyrimidine, 2-aminopyrimidine, 2-aminopyrazine, 2-hydroxypyrazine, 2-aminopurine, 6-hydroxypurine, 2-amino-1,3,4-thiadiazole and 2-amino-5-ethyl-1,3,4-thiadiazole.

The nitrogen-containing heterocycle is preferably a heterocycle having two or more nitrogen atoms in the skeleton, and more preferably a heterocycle having three nitrogen atoms or more in the skeleton. A group derived from triazole ring is particularly preferable. Preferred examples of the group are groups derived from 3-amino-1,2,4-triazole, 3-hydroxy-1,2,4-triazole, 3-aminomethyl-1,2,4-triazole, 3-methylamino-1,2,4-triazole, 3-methylol-1,2,4-triazole, 2-amino-1,3,4-thiadiazole, 2-amino-5-ethyl-1,3,4-thiadiazole, and the like.

The thermo-reversible, crosslinkable elastomer (7) has one or more nitrogen-containing heterocycles mentioned above in the molecule. In the case where the thermo-reversible, crosslinkable elastomer (7) has at least two nitrogen-containing heterocycles in the molecule, the type of the nitrogen-containing heterocycles may be the same or different.

Further, in the case where the thermo-reversible, crosslinkable elastomer (7) has at least two nitrogen-containing heterocycles, two or more nitrogen-containing heterocycles may be present in the same molecule.

The thermo-reversible, crosslinkable elastomer (7) may have a nitrogen-containing heterocycle that does not form hydrogen bond together with the other nitrogen-containing heterocycle.

The thermo-reversible, crosslinkable elastomer (7) is not particularly limited regarding the position of the nitrogen-containing heterocycles in the molecule. For example, the thermo-reversible, crosslinkable elastomer (7) may have the above-mentioned elastomeric polymer as a main-chain and the above-mentioned nitrogen-containing heterocycle as a side chain or as a main-chain. Further, the thermo-reversible, crosslinkable elastomer (7) may have the above-mentioned nitrogen-containing heterocycle at the molecular terminal of the elastomeric polymer.

The structure of the thermo-reversible, crosslinkable elastomer (7) having the elastomeric polymer as a main-chain and the nitrogen-containing heterocycle as a side chain is preferably a structure having a nitrogen-containing heterocycle, preferably a nitrogen-containing heterocycle having a heterocycle having two or more nitrogen atoms in the skeleton, more preferably a nitrogen-containing heterocycle having a heterocycle having three or more nitrogen atoms in the skeleton, that is obtained by reacting a compound having a nitrogen-containing heterocycle, preferably 3-amino-1,2,4-triazole, 4-methyl-1,2,4-triazoline-3,5-dione or 4-phenyl-1,2,4-triazoline-3,5-dione, with a copolymer of isobutylene and aromatic vinyl or diene type monomer and its bromide, halogenated butyl rubber and liquid isobutylene rubber.

Specific examples of the structure include a structure represented by the following formula (7-1) obtained by adding 3-amino-1,2,4-triazole to bromomethyl group of isobutylene-p-bromomethylstyrene copolymer, a structure represented by the following formula (7-2) obtained by adding 3-amino-1,2,4-triazole to bromomethyl group of brominated butyl rubber, a structure represented by the following formula (7-3) obtained by adding 4-methyl-1,2,4-triazoline-3,5-dione to double bond of liquid isoprene rubber, and a structure represented by the following formula (7-4) obtained by adding 4-phenyl-1,2,4-triazoline-3,5-dione to double bond of liquid isoprene rubber.

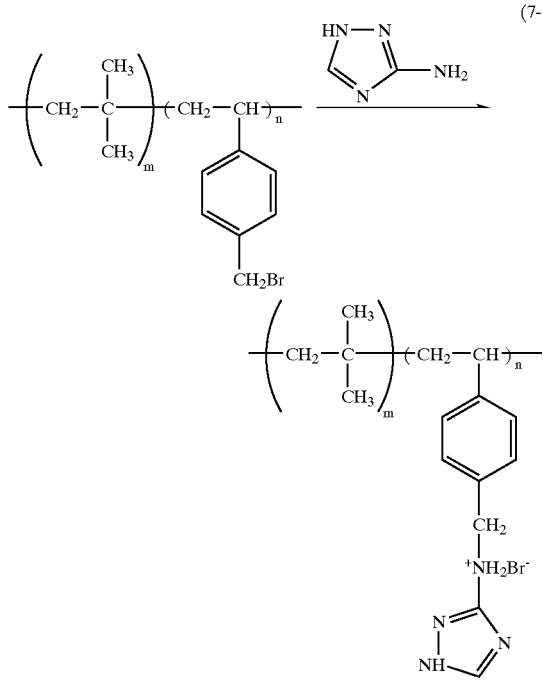

(7-1)

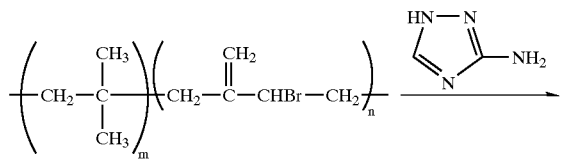

(7-2)

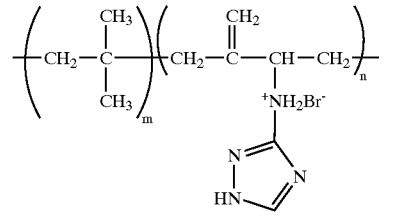

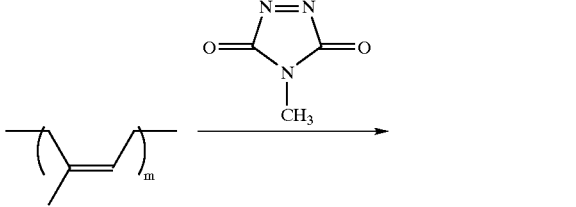

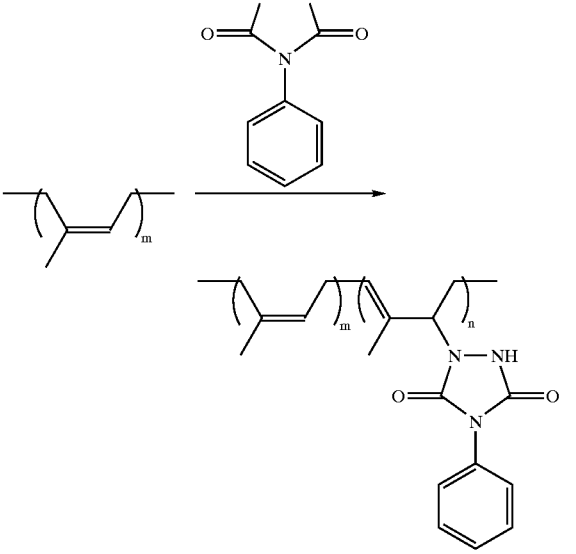

The structure of the thermo-reversible, crosslinkable elastomer (7) having the above-mentioned nitrogen-containing heterocycle at chain end of the elastomeric polymer includes structures obtained by adding tolylene diisocyanate (TDI) or diphenylmethane diisocyanate (MDI) to both terminals of isobutylene oligomer having both ends terminated with hydroxyl groups, polypropylene glycol having both ends terminated with hydroxyl groups or polytetramethylene glycol having both terminal hydroxyl groups, and then reacting a compound having nitrogen-containing heterocycles, preferably 3-amino-1,2,4-triazole, with the resulting isocyanate terminal groups, thereby introducing a nitrogen-containing heterocycle, preferably a nitrogen-containing heterocycle having heterocycle having two or more nitrogen atoms in the skeleton, more preferably a nitrogen-containing heterocycle having heterocycle having three or more nitrogen atoms in the skeleton.

Specific examples of the structure include a structure represented by the following formula (7-5) obtained by adding 3-amino-1,2,4-triazole to the terminal isocyanate groups of the TDI-terminated modified isobutylene oligomer obtained by adding TDI to terminal hydroxyl groups of the isobutylene oligomer having both terminal hydroxyl groups, a structure represented by the following formula (7-6) obtained by adding 3-amino-1,2,4-triazole to the terminal isocyanate groups of the MDI-terminated modified polypropylene glycol obtained by adding MDI to terminal hydroxyl groups of the polypropylene glycol having both terminal hydroxyl groups, a structure represented by the following formula (7-7) obtained by adding 3-amino-1,2,4-triazole to the terminal isocyanate groups of the TDI-terminated modified polypropylene glycol obtained by adding TDI to terminal hydroxyl groups of the polypropylene glycol having both terminal hydroxyl groups, and a structure represented by the following formula (7-8) obtained by adding 3-amino-1,2,4-triazole to the terminal isocyanate groups of the MDI-terminated modified polytetramethylene glycol obtained by adding MDI to terminal hydroxyl groups of the polytetramethylene glycol having both terminal hydroxyl groups.

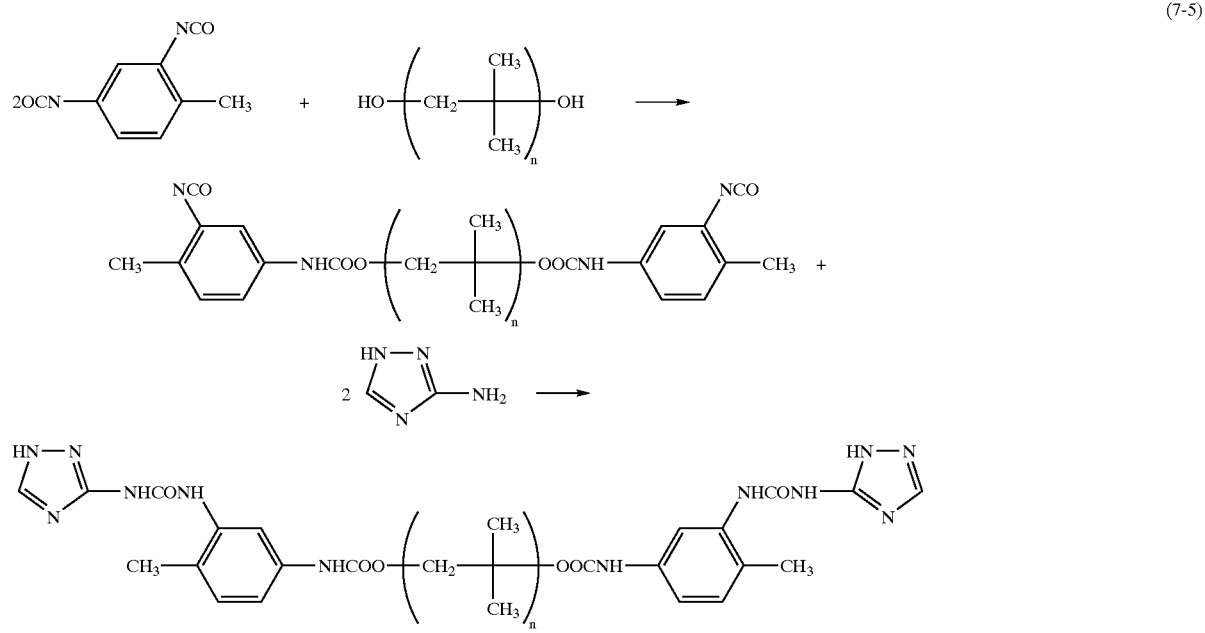

(7-5)

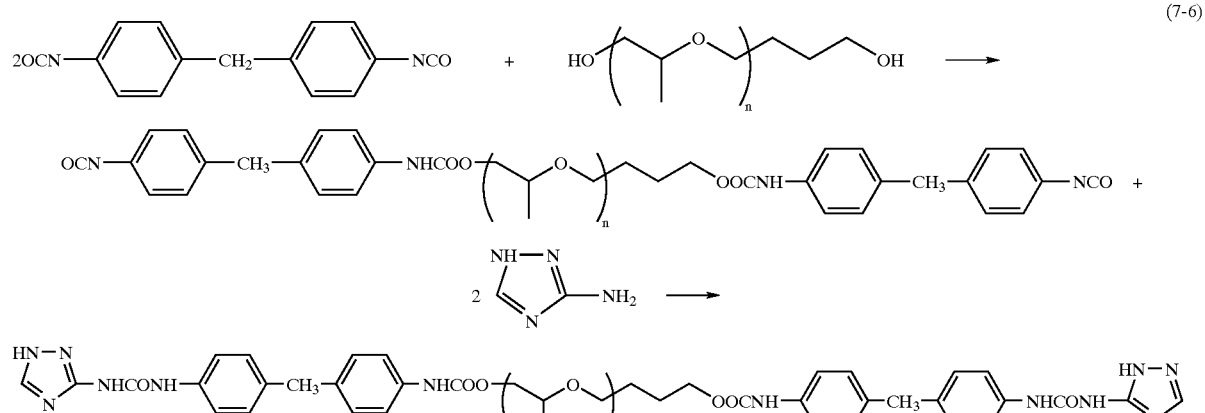

(7-6)

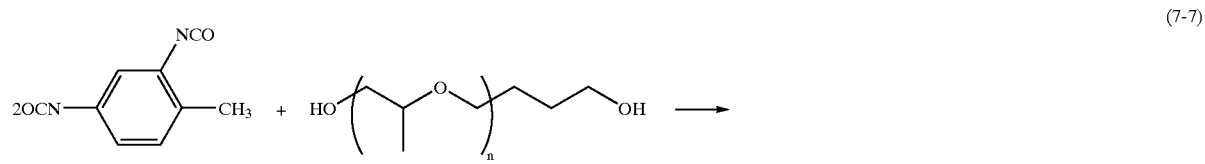

(7-7)

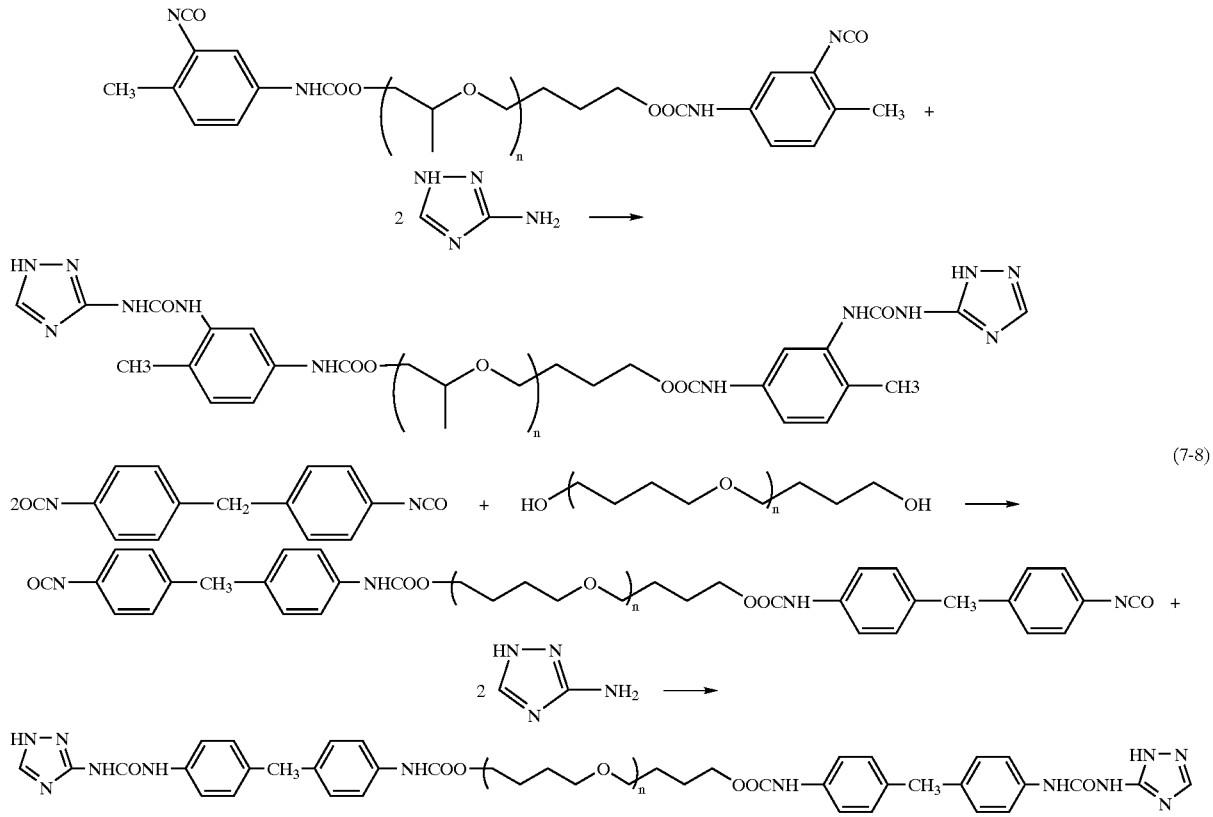

(7-8)

The thermo-reversible, crosslinkable elastomer of the present invention has a thermo-reversible crosslinkability utilizing crosslinking due to hydrogen bond, but can also use together a thermo-reversible reaction shown by the thermo-reversible, crosslinkable elastomers (1) to (6).

A process of producing the thermo-reversible, crosslinkable elastomer (7) is not particularly limited.

For example, when producing the elastomeric polymer, a monomer capable of forming a main-chain of a polymer and a copolymerizable monomer capable of introducing a nitrogen-containing heterocycle may be copolymerized to produce the thermo-reversible, crosslinkable elastomer (7) having a nitrogen-containing heterocycle as a side chain, or an elastomeric polymer constituting a main-chain may previously be formed by, for example, polymerization, followed by graft modification, terminal modification or the like using a compound capable of introducing a nitrogen-containing heterocycle.

In the thermo-reversible, crosslinkable elastomer (7) obtained by each of the above various processes, it can be confirmed by conventional analytical methods such as NMR spectrum whether the nitrogen-containing heterocycle is present as a side chain of the elastomeric polymer, or present as a terminal.

The above thermo-reversible, crosslinkable elastomer (7) can undergo self-crosslink by hydrogen bond. In hydrogen bonding, one of two nitrogen-containing heterocycles forming hydrogen bond becomes a donor (proton donor) and another becomes an acceptor (proton acceptor).

In hydrogen bonding, the ring having only a donor becomes a donor, and the ring having only an acceptor becomes an acceptor. In the case where hydrogen bond is formed by the rings having both a donor and an acceptor, whichever becomes a donor or an acceptor is not particularly limited.

In the present invention, the main-chain of the elastomeric polymer may participate in hydrogen bond.

Specifically, in the thermo-reversible, crosslinkable elastomer (7), if the hydrogen bond is shown by (donor)-H-(acceptor), hydrogen bond shown by O—H—O, N—H—O, O—H—N, N—H—N or the like is possible.

Such hydrogen bond may generate intermolecules or intramolecule, but it is preferable that the hydrogen bond generates at least between intermolecules.

The hydrogen bond in the thermo-reversible, crosslinkable elastomer (7) having the given nitrogen-containing heterocycle as mentioned above is thermotropical, and therefore forms a crosslinked structure in room temperature use and shows a flowability by decrosslinking upon heating at high temperature. The crosslinking/decrosslinking can be reproduced repeatedly.

In other words, the thermo-reversible, crosslinkable elastomer (7) is an elastomer in which at least one of the above nitrogen-containing heterocycles forms hydrogen bond with other nitrogen-containing heterocycle at room temperature, but the hydrogen bond upon heating at high temperature.

Therefore, the thermo-reversible, crosslinkable elastomer (7) can facilitate recycle utilization by melting a rubber, which is actually impossible in conventional chemically vulcanized rubbers using sulfur, peroxides or the like. Further, it can exhibit physical properties close to those of vulcanized rubbers due to crosslinking.

The thermo-reversible, crosslinkable elastomer (7) has specific nitrogen-containing heterocycles. Due to this, the elastomer (7) has high crosslinkability, and a crosslinked product thereof shows excellent rubber properties and can maintain stable hydrogen bond in use.

In other words, the elastomer can keep the hydrogen bond even at a high temperature that is inevitable in the use thereof.

Specifically, for example, in the thermo-reversible, crosslinkable elastomer represented by the above formula (7-1) or (7-2), dissociation temperature of hydrogen bond is 100° C. or higher, and hydrogen bond is formed in an extremely stable manner at room temperature.

Effective formation of hydrogen bond can be confirmed by observation of gelation phenomenon (viscosity increase) or measurement of infrared absorption spectrum, and dissociation of hydrogen bond is observed by decrease in viscosity (flowability increase) or decrease in hardness, measurement of infrared absorption spectrum, or the like.

Because of having the above-mentioned specific nitrogen-containing heterocycle, the thermo-reversible, crosslinkable elastomer (7) has curability in hydrogen bonding (crosslinking), shows large decrease in viscosity in hydrogen bond dissociation (decrosslinking) at high temperature, i.e., large solid-liquid change, and has excellent recycling property. In other words, the elastomer becomes extremely soft when heated at a high temperature exceeding the heat resistant temperature, and flowability markedly increases at a temperature of about 130° C. or higher, thus facilitating recycling.

Such effects of the thermo-reversible, crosslinkable elastomer (7) are exhibited by having the specified nitrogen-containing heterocycle. This is probably because the nitrogen atom in the heterocycle easily causes hydrogen bond as compared with nitrogen atom not forming a ring structure.

In the case where the thermo-reversible, crosslinkable elastomer (7) has a group derived from a nitrogen compound not having a heterocyclic structure in place of the specified nitrogen-containing heterocycle, hydrogen bond is weak and the thermo-reversible, crosslinkable elastomer (7) still maintains flowability.

The thermo-reversible, crosslinkable elastomer (7) is apt to exhibit inherent properties of an elastomer as compared with a conventional thermoplastic elastomer having crystal phase as a constraint phase. However, by appropriately selecting crosslinking density and the like, the elastomer (7) can exhibit sufficient mechanical strength and rubber elasticity, comparable to conventional chemically vulcanized rubbers using sulfur, peroxides or the like.

The crosslinking density varies depending on purpose of use, application, molecular weight of main-chain, and the like and cannot generally be determined, but crosslinking density showing sufficient rubber elasticity and excellent mechanical strength when crosslinking is preferable. For example, when the main-chain is a diene rubber such as isoprene or butadiene, it is preferable that the specified nitrogen-containing heterocycle is contained in an amount of about 1 to 15 mol unit percent, preferably 3 to 15 mol unit percent to monomer unit of the main chain.

The thermo-reversible, crosslinkable elastomer (8) will be explained below.

The thermo-reversible, crosslinkable elastomer (8) is characterized by having at least two members selected from the group consisting of an aromatic ring having a substituent in which a substituent constant σ of Hammett's rule has a positive value, an aromatic ring having a substituent in which the above σ has a negative value, an unsubstituted aromatic ring in which the above σ is 0, and a nitrogen-containing heterocycle, as side chains. Among those, the elastomers having at least two members selected from the group consisting of an aromatic ring having a substituent in which a substituent constant σ has a positive value, an aromatic ring having a substituent in which the above σ has a negative value, and a nitrogen-containing heterocycle, as side chains are preferable.

The Hammett's rule is a kind of rule of thumb, i.e., a rule derived from experience, and is proposed by L. P. Mammett in 1935 in order to quantitatively discuss influence of a substituent on reaction or equilibrium of organic compound. The substituent constant σ is a constant determined by kind and position of substituent, and it is known that there is the tendency of σ=0 in the case of non-substitution, σ<0 in electron donating group and σ>0 in electron withdrawing group.

The unsubstituted aromatic ring in which σ is 0 and which is used in the present invention is preferably benzene ring, for example.

Examples of the substituent used in the present invention in which σ has a positive value include halogen atom such as fluorine atom or chlorine atom, phenyl group, cyano group, nitro group, acetyl group and carboxyl group. At least one selected from those is preferable. Due to having those substituents, there is the tendency that π electron density in an aromatic ring increases. Position of the substituent is not particularly limited. In the case of having two substituents, the two substituents may be any of o-, m- or p-substituent, and the same can apply to the case of having three or more substituents.

Examples of substituent in which σ shows a negative value include alkyl group, methoxy group, phenoxy group, hydroxyl group and amino group. At least one selected from those is preferable. Similar to the case where σ shows a positive value, position of the substituent is not particularly limited.

The alkyl group is preferably a straight-chain or branched chain having 1 to 20 carbon atoms, more preferably a straight-chain or branched chain having 1 to 6 carbon atoms. Examples of the alkyl group include methyl group, ethyl group, propyl group, isopropyl group, butyl group, isobutyl group, t-butyl group, n-hexyl group and the like.

The amino group may be an amino group having one or two substituents such as methyl group, ethyl group or propyl group. Specifically, preferable examples of the amino group having substituents include N,N-dimethylamino group and N,N-diethylamino group.

The thermo-reversible, crosslinkable elastomer (8) has a non-substituted aromatic ring (σ=o) or the above-mentioned aromatic ring to which the substituent of σ>0 or σ<0 is bonded, as a side chain. The thermo-reversible, crosslinkable elastomer (8) may also have a nitrogen-containing heterocycle as a side chain.

The nitrogen-containing heterocycle used in the present invention is not particularly limited so long as it contains nitrogen atom as a ring member element. The nitrogen-containing heterocycle may also contain oxygen atom, sulfur atom, phosphorus atom and the like as a ring member element. For example, five-membered nitrogen-containing heterocycles shown below, triazine, triazolidine, pyridine, pyrimidine, pyrazine, quinoline, phenazine and pteridine are preferably used.

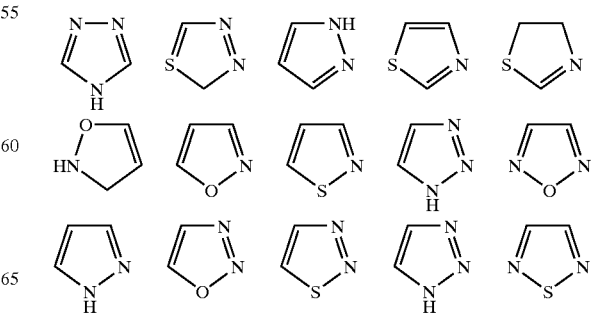

-continued

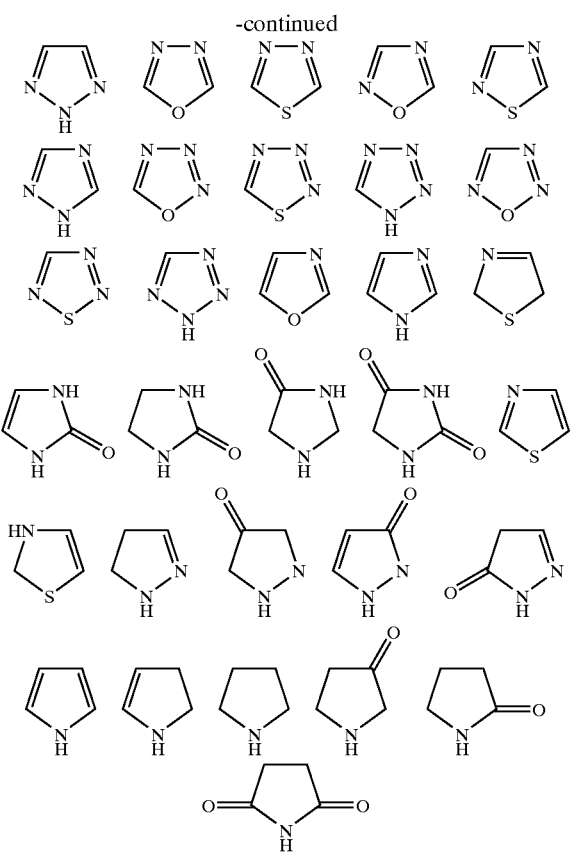

Further, the above-mentioned heterocycles to which benzene ring is condensed, or condensed rings in which the above-mentioned monocyclic heterocycles are condensed and bonded to each other can also be used. For example, listed in the following are preferred condensed rings.

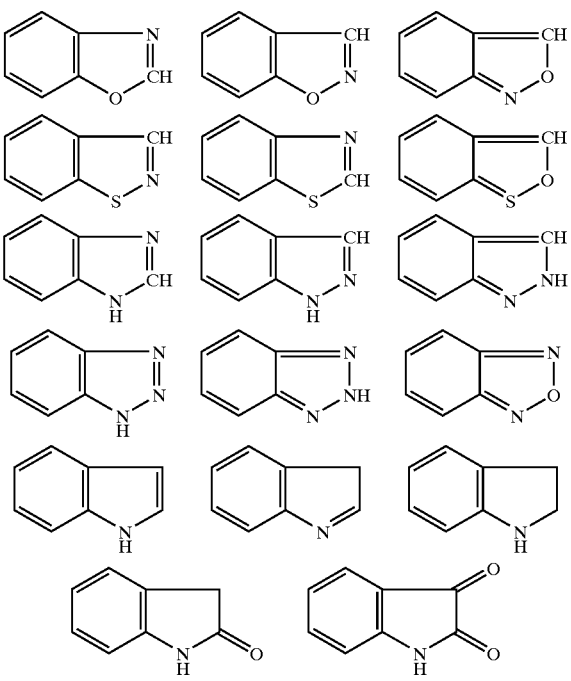

-continued

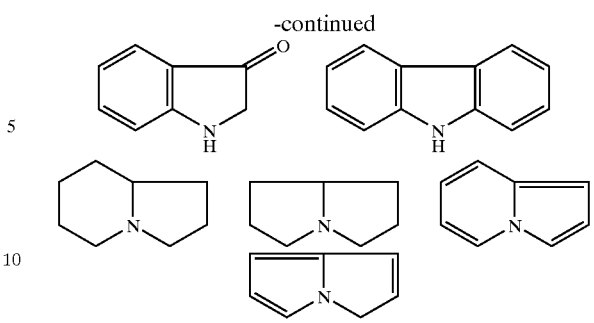

The above-mentioned nitrogen-containing heterocycle may contain substituents. Examples of the substituent include alkyl groups such as methyl group, ethyl group, (iso)propyl group and hexyl group; alkoxyl groups such as methoxy group, ethoxy group and (iso)propoxy group; halogen atoms such as fluorine atom, chlorine atom and iodine atom; cyano group, amino group, aromatic hydrocarbon group, carbonyloxy group, ether group, acyl group and thioether group. Those may be used in combination of two or more thereof. Position of substituent is not particularly limited, and the number of substituent is also not particularly limited. The above heterocycle may have or may not have aromaticity, but if the ring has an aromaticity, further stronger interaction can be exhibited, which is preferable. Five-membered nitrogen-containing heterocycle is particularly excellent in this regard. The above-mentioned heterocycles may be hydrogenated or dehydrogenated.

The aromatic ring having the above-mentioned substituent ($\sigma>0$ or $\sigma<0$), unsubstituted aromatic ring ($\sigma=0$) or nitrogen-containing heterocycle (hereinafter those are referred to as a "ring structure A") is introduced as a side chain of the elastomeric polymer constituting the main-chain of the thermo-reversible, crosslinkable elastomer (8).

The thermo-reversible, crosslinkable elastomer (8) can thermoreversibly reproduce cross-linking and dissociation by introducing the ring structure A to the main-chain as a side chain. The elastomer has rubber elasticity and has very high tensile strength at 120° C. or lower. If the temperature exceeds 120° C., flowability is imparted, making it possible to conduct remolding. Further, the elastomer over 120° C. is a material having excellent recycling property, which does not decrease physical properties even if crosslinking and dissociation are repeatedly conducted.

The present inventors believe that interaction of π electron on the aromatic ring contributes to this phenomenon. In other words, it is believed that electrical interaction of π electron acts intermolecules or intramolecule, pseudo-crosslinking is formed at a certain temperature or lower, and if the certain temperature is exceeded by heating, molecules actively move so that crosslinking can not be maintained, and as a result, flowability is exhibited.

The side chain intended in the present invention contains at least two kinds of the above-mentioned ring structure A, but from the above viewpoint, a combination that further increases the interaction between π electrons, that is, a combination of an aromatic ring having a substituent in which σ shows a positive value and an aromatic ring having a substituent in which σ shows a negative value, is preferable. Further, it is preferable to have an aromatic ring having a substituent in which σ shows a positive value and a nitrogen-containing heterocycle, as side chains. By combining those side chains, interaction between π electrons complementarily acts intermolecules or intramolecule.

The ring structure A of the present invention may directly bond to the main-chain. However, from the viewpoint of synthesis, the ring structure A preferably bonds to those ring groups through a bonding group such as amide group, methylene group, ethylene group, carbonyloxy group or thioether group by reacting a compound containing a group capable of covalently bonding to the main-chain, such as amino group, hydroxyl group, carboxyl group, thiol group or sulfide group. Among those, amide group and carbonyloxy group are particularly preferable in the point of forming a complementary hydrogen bond.

The thermo-reversible, crosslinkable elastomer (8) may further have, in addition to the above ring structure A, carbonyl-containing group in the same side chain of the ring structure A or in another side chain. Examples of the carbonyl-containing group include amide, carbonyloxy, imide or carboxyl group. Compound capable of introducing such a group is not particularly limited, and examples thereof include carboxylic acid compounds and their derivatives.

The carboxylic acid compounds include organic acids having saturated or unsaturated hydrocarbon groups. The hydrocarbon group may be any of aliphatic, alicyclic or aromatic carboxylic acid. Examples of the carboxylic acid derivative include carboxylic anhydrides, esters, ketones, amino acid, amides, imides and thiocarboxylic acid (mercapto group-containing carboxylic acid).

Specific examples thereof include carboxylic acids or substituent-containing carboxylic acids, such as malonic acid, maleic acid, succinic acid, glutaric acid, phtalic acid, isophthalic acid, terephthalic acid, p-phenylenediacetic acid, p-hydroxybenzoic acid, p-aminobenzoic acid and mercaptoacetic acid; acid anhydrides such as succinic anhydride, maleic anhydride, glutaric anhydride, phthalic anhydride, propionic anhydride and benzoic anhydride; aliphatic esters such as maleate, malonate, succinate, glutarate and ethyl acetate; aromatic esters such as phthalate, isophthalate, terephthalate, ethyl-m-aminobenzoate and methyl-p-hydroxybenzoate; ketones such as quinone, anthraquinone and naphthoquinone; amino acids such as glycine, tricine, vicine, alanine, valine, leucine, serine, threonine, lysine, aspartic acid, glutamic acid, cysteine, methionine, proline and N-(p-aminobenzoyl)-β-alanine; amides such as maleinamide, maleinamidic acid (maleinmonoamide), succinic acid monoamide, 5-hydroxyvaleramide, N-acetylethanolamine, N,N'-hexamethylenebis(acetamide), malonamide, cycloserine, 4-acetamidephenol and p-acetamidobenzoic acid; and imides such as maleinimide and succinimide.

Among those, the carbonyl-containing group of the present invention is preferably derived from a cyclic acid anhydride such as succinic anhydride, maleic anhydride, glutaric anhydride or phthalic anhydride, and more preferably derived from maleic anhydride.

The ring structure A of the present invention can be bonded to the same side chain by bonding the above-mentioned cyclic acid anhydride to the elastomeric polymer to react the ring structure with a compound having a covalent bonding group, and ring-opening the cyclic acid anhydride.

In the case of having the ring structure in the same side chain, the side chain preferably has, for example, a structure having the following formula (a), (b) or (c), whereby the recycling property of the present invention is further increased.

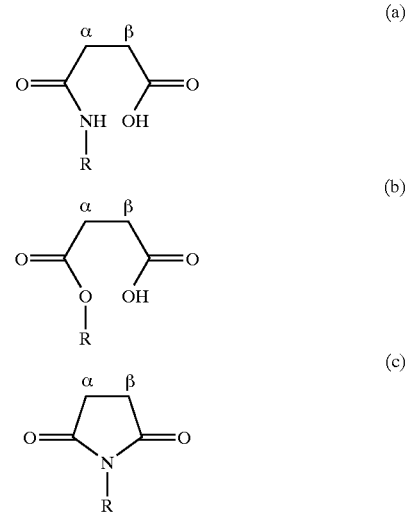

wherein R represents the ring structure A and bonds to the main-chain at α- or β-position.

Since the side chain of the thermo-reversible, crosslinkable elastomer (8) has the structure of the above formula (a), (b) or (c), it is considered that in addition to the interaction between π electrons mentioned above, carbonyl group, hydroxyl group, inimo group, carboxyl group, amide group or the like can form hydrogen bond in the molecule or between molecules, whereby pseudo-crosslinking strength is further increased. Further, there is a possibility that an interaction between those hydrogen bonding groups and π electron (NH-π, OH-π, CH-π interaction) contributes, and it is believed that as a result of combination of a plurality among those interactions, recycling property of the thermo-reversible, crosslinkable elastomer (8) is realized.

In the thermo-reversible, crosslinkable elastomer (8), the proportion of the side chain moiety is preferably 0.1 to 50 parts by weight, more preferably 0.1 to 35 parts by weight, per 100 parts by weight of the main-chain moiety. This proportion is that in the case where the main-chain moiety is, for example, isoprene rubber, a monomer introduced of the side moiety is about 0.1 to 35 mol %, per mole of the isoprene monomer. Within this range, balance of interaction among those side chains is good intermolecules or intramolecule, and tensile strength in crosslinking using the thermo-reversible, crosslinkable elastomer (8) is very high, thereby having rubber elasticity. If the proportion of the side chain moiety is less than 0.1 part by weight, strength at crosslinking is not sufficient, and if it exceeds 50 parts by weight, rubber elasticity is impaired, which is not preferable.

In the case of having carbonyl-containing group as an independent side chain, the ratio of the same to the side chain having the ring structure A is preferably 1:1 in that complementary interaction can be developed. Further, the thermo-reversible, crosslinking elastomer (8) preferably has its glass transition temperature of 25° C. or lower in the case where it is desired to obtain the desired rubber elasticity at room temperature.

A process of producing the thermo-reversible, crosslinkable elastomer (8) of the present invention is not particularly limited, and the elastomer can be produced by conventional processes. For example, in the case where carbonyl-containing group and the ring structure A are present in the same side chain, the elastomer (8) is obtained by reacting the elastomeric polymer modified with the carbonyl-containing group with a compound having the ring structure A and a covalent bonding group generally at a temperature of about room temperature to 200° C. for 3 to 5 hours.

The modified elastomeric polymer is obtained by, for example, stirring a diene rubber such as butadiene rubber, and in mercaptoacetic acid toluene at room temperature for 1 hour under nitrogen atmosphere, precipitating the reaction mixture in methanol, and drying the precipitate under reduced pressure.

Commercially available products can also be used, and examples thereof include maleic anhydride-modified isoprene rubbers such as LIR-403, LIR-410 or LIR-410A (products of Kuraray Co., Ltd.), carboxyl-modified nitrile rubbers such as Crynack 110, 221 and 231 (products of Polysar Corporation), carboxyl-modified polybutene such as CPIB (a product of Nisseki Chemical Co., Ltd) or HRPIB (a laboratory sample product of Nisseki Chemical Co., Ltd.), Neucurel (a product of Du Pont—Mitsui Polychemicals Co., Ltd.) and Yukaron (a product of Mitsubishi Chemical Corporation).

Further, after previously bonding carbonyl-containing group and a compound having the ring structure A and a covalent bonding group, such can be introduced in the side chain of the elastomeric polymer.

In the case where the carbonyl-containing group and the ring structure A are not present in the same side chain and are separately introduced as a side chain independent of each other, a monomer capable of forming a main-chain of the polymer and a copolymerizable monomer capable of introducing the above group may be copolymerized to directly produce the thermo-reversible, crosslinkable elastomer (8). Alternatively, a main-chain (elastomeric polymer) is previously formed by, for example, polymerization, and it may be graft-modified with a compound capable of introducing the above group.

In each production process, whether each group of the side chain of the elastomeric polymer is independently bonded or is mutually bonded can be confirmed by conventional analytical means such as NMR or IR spectrum.

The rubber composition according to the second aspect of the present invention will be explained below.

The rubber composition of the present invention contains the above-mentioned thermo-reversible, crosslinkable elastomers (1) to (8). The thermo-reversible, crosslinkable elastomers to be contained may be one kind or two kinds or more.

The rubber composition of the present invention can contain additives such as various fillers, coloring materials, anti-aging agents, antioxidants, stabilizers, flame retardants and antistatic agents. Those additives can be added in the course of the production of the thermo-reversible, crosslinkable elastomer or after production of the thermo-reversible, crosslinkable elastomer.

Examples of the filler include fumed silica, calcined silica, precipitated silica, ground silica, molten silica, diatomaceous earth, iron oxide, zinc oxide, titanium oxide, barium oxide, magnesium oxide, calcium carbonate, magnesium carbonate, zinc carbonate, clay, kaolin and calcined clay. The filler is added in an amount of preferably 20 to 80 parts by weight, more preferably 30 to 60 parts by weight, per 100 parts by weight of the thermo-reversible, crosslinkable elastomer.

Carbon black is also preferably used as the filler, and is appropriately selected according to the purpose of use. In general, carbon black is classified into hard carbon and soft carbon based on particle size of carbon black. Soft carbon has low reinforcing property to a rubber and hard carbon has strong reinforcing property to a rubber. It is particularly preferable in the present invention to use hard carbon having strong reinforcing property. The hard carbon is used in an amount of 10 to 70 parts by weight, preferably 20 to 60 parts by weight, more preferably 30 to 50 parts by weight, per 100 parts by weight of the thermo-reversible, crosslinkable elastomer.

Examples of the coloring material include inorganic pigments such as titanium dioxide, zinc oxide, ultramarine blue, red iron oxide, lithopone, lead, cadmium, iron, cobalt, aluminum, chlorides or sulfates, and organic pigments such as azo pigments or copper phthalocyanine pigment. The coloring material is used in an amount of preferably 0.1 to 10 parts by weight, more preferably 1 to 5 parts by weight, per 100 parts by weight of the thermo-reversible, crosslinkable elastomer.

Examples of the anti-aging agent include hindered phenol type compounds and aliphatic or aromatic hindered amine type compounds. The anti-aging agent is used in an amount of preferably 0.1 to 10 parts by weight, more preferably 1 to 5 parts by weight, per 100 parts by weight of the thermo-reversible, crosslinkable elastomer.

Examples of the antioxidant include butyl hydroxytoluene (BHT), butyl hydroxyanisole (BHA), etc. The antioxidant is used in an amount of preferably 0.1 to 10 parts by weight, more preferably 1 to 5 parts by weight, per 100 parts by weight of the thermo-reversible, crosslinkable elastomer.

The thermo-reversible, crosslinkable elastomer of the present invention can self-crosslink, but vulcanizing agents, vulcanization assistants, vulcanization accelerators and the like can further be used in an amount that does not spoil the aim of the present invention.

Examples of the vulcanizing agent include sulfur type vulcanizing agents such as sulfur powder, precipitating sulfur, highly dispersible sulfur, surface-treated sulfur, insoluble sulfur, dimorpholine disulfide and alkylphenol disulfide; organic peroxide type vulcanizing agents such as benzoyl peroxide, t-butyl hydroperoxide, 2,4-dichlorobenzoyl peroxide, 2,5-dimethyl-2,5-di(t-butylperoxy)hexane, 2,5-dimethylhexane-2,5-di (peroxylbenzoate) and dicumyl peroxide; phenolic resin type vulcanizing agents such as mixed crosslinking type containing a bromide of alkylphenolic resin, a halogen donor such as tin chloride or chloroprene, and alkylphenolic resin; zinc flower, magnesium oxide, litharge, p-quinone dioxime, p-dibenzoylquinone dioxime, tetrachloro-p-benzoquinone, poly-p-dinitrobenzene and methylene dianiline.

Examples of the vulcanization assistant include fatty acids such as acetylenic acid, propionic acid, butanoic acid, stearic acid, acrylic acid and maleic acid; and fatty acid zinc such as zinc acetylate, zinc propionate, zinc butanoate, zinc stearate, zinc acrylate and zinc maleate.

Examples of the vulcanization accelerator include thiuram type vulcanization accelerators such as tetramethylthiuram disulfide (TMTD) and tetraethylthiuram disulfide (TETD), aldehyde-ammonia type vulcanization. accelerator such as hexamethylene tetramine, guanidine type vulcanization accelerator such as diphenyl guanidine, thiazole type vulcanization accelerator such as dibenzothiazole disulfide, and sulfenamide type vulcanization accelerator such as cyclohexylbenzothiazyl sulfenamide. Alkyl phenolic resins or halogenated products thereof can also be used.

The rubber composition of the present invention can further contain one or more of elastomers other than the thermo-reversible, crosslinkable elastomer of the present invention in an amount that does not spoil the aim of the present invention. This makes it possible to control strength property or the like of the rubber composition of the present invention, and also reduce raw material cost.

The elastomer other than the thermo-reversible, crosslinkable elastomer of the present invention may be unvulcanized elastomer or vulcanized elastomer. Examples of such an elastomer include elastomers that are raw material of the thermo-reversible, crosslinkable elastomer of the present invention. Among those, unvulcanized rubber is preferable considering rubber elasticity, easy processability, recycling property or the like of the rubber composition of the present invention.

In particular, the rubber composition of the present invention is obtained by conducting crosslinking while kneading the thermo-reversible, crosslinkable elastomer of the present invention and unvulcanized rubber, i.e., conducting a so-called dynamic crosslinking. The rubber composition is preferably in a state that a vulcanized rubber phase is finely dispersed such that at least a part thereof is a continuous phase and at least a part thereof is a discontinuous phase.

The content of the thermo-reversible, crosslinkable elastomer of the present invention in the rubber composition of the present invention is preferably 10 mass (weight) % or more, more preferably 50 mass % or more of the entire composition. Within this range, the rubber composition of the present invention has sufficient rubber elasticity, ease processability and recycling property.

Use of the rubber composition of the present invention is not particularly limited, and it can be used in various uses. For example, it can be applied to various vulcanization rubber uses, utilizing rubber elasticity thereof. If the rubber composition is contained in a hot-melt adhesive, heat resistance and recycling property can be improved.

Further, if the rubber composition of the present invention is contained as a modifier of rubber, for example, as a flow-preventive agent, in a resin or a rubber which causes cold flow at room temperature, flow in extrusion or cold flow can be prevented. If carbon black or the like is further contained, tensile strength, tear strength, flexural strength or the like can further be improved.

The rubber-bonded body according to the third aspect of the present invention will be explained below.

The rubber-bonded body of the present invention is a rubber-bonded body comprising a rubber layer containing the rubber composition of the present invention and a vulcanized rubber layer containing a vulcanized rubber composition, bonded to the former layer. In particular, the rubber composition of the present invention is preferably a thermo-reversible, crosslinkable rubber composition.

The vulcanized rubber composition used in the present invention contains a rubber and a vulcanizing agent. As described hereinafter, the rubber-bonded body of the present invention is obtained by adhering the rubber composition of the present invention and a vulcanized rubber composition at a high temperature and a high pressure (hot press). At the time of hot press, the vulcanized rubber may be a rubber that has already been vulcanized, or an unvulcanized rubber.

The rubber used in the vulcanized rubber composition can use the same materials as listed as elastomeric polymers used as raw material of the thermo-reversible, crosslinkable elastomer of the present invention.

The vulcanizing agent used is a general rubber vulcanizing agent. Examples thereof include vulcanizing agents listed in connection with the rubber composition. Among those, a sulfur type vulcanizing agent is preferable, and it is used in an amount of, for example, about 0.5 to 4 parts by weight per 100 parts by weight of the rubber.

The organic peroxide type vulcanizing agent is used in an amount of, for example, about 1 to 15 parts by weight per 100 parts by weight of the rubber.

The phenolic resin type vulcanizing agent is used in an amount of, for example, about 1 to 20 parts by weight per 100 parts by weight of the rubber.

Further examples of the vulcanizing agent that can be used include zinc white (about 5 parts by weight per 100 parts by weight of rubber; the basis is hereinafter the same), magnesium oxide (about 4 parts by weight), litharge (about 10–20 parts by weight), p-quinone dioxime, p-dibenzoylquinone dioxime, tetrachloro-p-benzoquinone, poly-p-dinitrosobenzene (each about 2–10 parts by weight) and methylene dianiline (each about 0.2–10 parts by weight). Vulcanization accelerators and vulcanization assistants listed in connection with the rubber composition of the present invention may be also used.

The vulcanized rubber composition mentioned above can further contain other additives, such as reinforcing agents, anti-aging agents, processing assistants, various stabilizers, flame retardants, antistatic agents, coloring materials and fillers, in an amount that does not spoil the aim of the present invention.

The rubber-bonded body of the present invention is obtained by adhering the rubber composition of the present invention and the above vulcanized rubber composition with a hot press.

Conditions of hot press are not particularly limited.

Temperature is preferably 120 to 250° C., more preferably 150 to 200° C.

Pressure is preferably 0.1 to 30 MPa, more preferably 1 to 10 MPa.

In the case where a rubber composition which has already be vulcanized is used as a vulcanized rubber composition, when the rubber composition of the present invention and the vulcanized rubber composition are laminated and hot pressed, the rubber composition of the present invention partially melts to fuse to the vulcanized rubber composition by an anchor effect, and at the same time, crosslinking occurs between the thermo-reversible, crosslinkable elastomer and the vulcanized rubber by migration of the vulcanizing agent that remained around the interface between the rubber layer and the vulcanized rubber layer. Due to this crosslinking, the rubber layer is very strongly adhered to the vulcanized rubber layer.

In the case where an unvulcanized rubber composition is used as a vulcanized rubber composition, when the rubber composition of the present invention and the unvulcanized rubber composition are laminated and hot pressed, the unvulcanized rubber composition crosslinks by the vulcanizing agent contained in the unvulcanized rubber composition, and at the same time, crosslinking occurs between the thermo-reversible, crosslinkable elastomer and the vulcanized rubber by migration of the vulcanizing agent around the interface between the rubber layer and the unvulcanized rubber layer. Due to this crosslinking, the rubber layer is very strongly adhered to the unvulcanized rubber layer.

In bonding a layer containing the rubber composition of the present invention and a layer containing the vulcanized rubber composition, if the main-chain of an elastomer of the rubber layer containing the rubber composition of the present invention and the vulcanized rubber layer containing the vulcanized rubber composition has repeating units formed of the same monomer component, it is preferable that the rubber layer can be further strongly adhered to the vulcanized rubber layer. In other words, it is preferable that the main-chain of the elastomer component contained in the rubber composition of the present invention and the rubber contained in the vulcanized rubber composition have repeating units formed of at least one identical monomer component. The elastomer component is at least one member selected from the main-chain of the thermo-reversible, crosslinkable elastomer of the present invention and elastomers other than the thermo-reversible, crosslinkable elastomer of the present invention. Thus, it is believed that the elastomer main-chain has repeating units comprising the same monomer component, which enhances compatibility between the above-mentioned two layers, thereby improving adhesiveness at the interface thereof.

Structure of the rubber-bonded body of the present invention is not particularly limited, and a two-layer structure comprising the rubber layer and the vulcanized rubber layer suffices. For example, the structure may be a three-layer structure comprising the rubber layer interposed between two vulcanized rubber layers.

Shape and size of the rubber-bonded body of the present invention are not particularly limited, and can freely be determined according to the purpose of use or the like. For example, the rubber layer can be a plate-like material having a thickness of, for example, 0.1 to 100 mm, 0.1 to 10 mm or 0.1 to 4 mm.

The purpose of use of the rubber-bonded body of the present invention is not particularly limited, and various rubber structures can be formed.

In the rubber-bonded body of the present invention, the rubber layer shows excellent rubber properties and adhesion between the rubber layer and the vulcanized rubber layer is strong, at a temperature lower than the temperature at which the crosslinking of the thermo-reversible, crosslinkable elastomer of the present invention decrosslinks, and strength of the rubber-bonded body is comparable to the strength of only rubber itself. On the other hand, at a temperature higher than the temperature at which the crosslinking of the thermo-reversible, crosslinkable elastomer of the present invention decrosslinks, the crosslinking of the thermo-reversible, crosslinkable elastomer of the present invention decrosslinks, and the rubber layer softens. As a result, the rubber layer can easily be peeled off the vulcanized rubber layer.

Therefore, the rubber-bonded body of the present invention shows the same strength properties and heat resistance as rubber itself, and when heated to a certain temperature, the rubber layer can easily be peeled off the vulcanized rubber layer. Thus, products capable of recycling can be formed. For example, in the case where the vulcanized rubber layer abrades or breaks due to use, such a damaged vulcanized rubber layer can be peeled off the rubber layer by heating, and a fresh vulcanized rubber layer can be adhered under pressure to the rubber layer. In this case, a fresh rubber composition of the present invention can also be replenished to the rubber layer prior to adhering under pressure.

Further, in the case where the rubber layer abrades or breaks due to use, such a damaged rubber layer can be peeled off the vulcanized rubber layer by heating, and a fresh rubber layer of the present invention can be adhered under pressure to the vulcanized rubber layer, or the rubber layer can be softened by heating and repaired.

Temperature at which the rubber layer is peeled off the vulcanized rubber layer in the rubber-bonded body of the present invention is not limited if it is a temperature at which the crosslinking of the rubber composition of the present invention decrosslinks, or higher, but the temperature is preferably lower than the temperature at which the vulcanized rubber composition deteriorates. Even at a temperature higher than the temperature at which the vulcanized rubber composition deteriorates, if the heat treatment time is short, the rubber composition of the present invention can be dissolved before substantial deterioration of the vulcanized rubber composition occurs.

A method of heat adhering a vulcanized rubber layer and a hot melt type adhesive layer has been conventionally proposed as disclosed in, for example, Japanese Patent Laid-open Application No. Hei 10-183082. However, the hot melt type adhesive generally having only a thermoplastic resin blended therewith in a large amount has low heat resistance, and also has weak adhesiveness at an interface. Thus, there was a problem such as weakness in repeated fatigue. Contrary to this, the rubber-bonded body of the present invention has excellent heat resistance and adhesiveness as mentioned before, and does not have the problems involved in the conventional hot melt type adhesive.

The rubber structure according to the fourth aspect of the present invention is a rubber structure having the rubber-bonded body in at least a part thereof. In other words, the rubber structure of the present invention may consist of only the rubber-bonded body, or may comprise a composite of the rubber-bonded body and other material such as rubber, resin or metal.

The structure of the rubber structure of the present invention is not particularly limited. For example, the structure may be such that a member to be abraded or broken or the like is made of a vulcanized rubber layer and a rubber layer is arranged so as to come in contact with the member. Alternatively, the rubber structure may have a structure in which the member itself to be abraded or broken is made of the rubber layer in at least a part thereof. In particular, a structure in which the member to be abraded or broken is made of a vulcanized rubber layer and a rubber layer having a thickness of about 0.1 to 100 mm, preferably 0.1 to 10 mm, more preferably 0.1 to 4 mm is present so as to come in contact with the member is one preferred configuration.

The rubber structure of the present invention can be used as any rubber products in which a rubber is used in at least a part thereof, in wide fields such as automobiles, aircraft or medical treatment.

In particular, the rubber structure of the present invention is preferably used for the following: automobile parts such as tread or carcass of tires; exteriors such as radiator grills, side braids, garnishes (pillars, rears, caul tops), aero parts (air dams, spoilers), wheel covers, weather strips, air outlet rouvers, air scoops, hood bulges, ventilation hole parts, anticollision parts (overfenders, side seal panels, braids of windows, of hoods, and of door belts), marks; interior door frame parts such as weather strips of doors, of lights, and of wipers, glass runs, and glass run channels; air duct hoses, radiator hoses, break hoses; lubricant-related parts such as crank shaft seals, valve stem seals, head cover gaskets, A/T oil cooler hoses, transmission oil seals, P/S hoses or P/S oil seals; fuel-related parts such as fuel hoses, emission control hoses, inlet filler hoses or diaphragms; anti-vibration parts such as engine mounts or intank pump mounts; boots such as CVJ boots or rack and pinion boots; air conditioning parts such as A/C hoses or A/C seals; belt parts such as timing belts or belts for auxiliary machineries; and window shield sealers, vinyl plastisol sealers, anaerobic sealers, body sealers, and spot weld sealers.

The rubber structure of the present invention is also used in high pressure hoses; civil engineering and building materials such as water-shielding sheets, base isolation rubber support mechanisms, rubber joints, seal packings or rubber fences; ship-related products such as rubber-made buoys or fenders; anti-vibration rubbers such as soundproof mats, air springs or vibration control rubbers; various rollers; and various sheets such as rubber sheets in parking lots.

EXAMPLES

The present invention is described in more detail referring to the following Examples, but the invention should not be limited to those Examples.

Example A

1. Synthesis of Thermo-reversible, Crosslinkable Elastomers (1) to (6)

Example 1

Synthesis of Thermo-reversible, Crosslinkable Elastomer (1) (Ester-formed Rubber)

Styrene-butadiene rubber (Nipol 1502, a product of Nippon Zeon Co., Ltd., styrene content 23%) 300 g (butadiene unit 4.3 mol) was dissolved in xylene 2.54 liters, and maleic anhydride 105 g (1.1 mol) and Irganox 1520 (a product of Ciba-Geigy Japan Limited) 180 g (0.43 mol) were added thereto. The resulting mixture was stirred at 140° C. for 20 hours to conduct reaction. The reaction solution was precipitated in acetonitrile, and the precipitate was dried under reduced pressure to obtain a styrene-butadiene rubber having maleic anhydride group introduced therein (maleic anhydride group-containing SBR). The proportion of the maleic anhydride group introduced in the maleic anhydride group-containing SBR obtained was 3.0 mol % to butadiene unit.

1,6-Hexane diol 4.3 g was added to the obtained maleic anhydride group-containing SBR (modification rate 3 mol %) 100 g, and the resulting mixture was mixed by stirring with a kneader under the conditions of 120° C., 60 rpm and 20 minutes to obtain thermo-reversible, crosslinkable elastomer (1) (ester-formed rubber).

Example 2

Synthesis of Thermo-reversible, Crosslinkable Elastomer (2) (Hemiacetal Ester-formed Rubber)

Isoprene rubber (Nipol IR-2200, a product of Nippon Zeon Co., Ltd.) 260 g (isoprene unit 3.8 mol) was dissolved in xylene 2.54 liters, and maleic anhydride 186 g (1.9 mol) and Irganox 1520 162 g (0.38 mol) were added thereto. The resulting mixture was stirred at 140° C. for 20 hours to conduct reaction. The reaction solution was precipitated in acetonitrile, and the precipitate was dried under reduced pressure to obtain an isoprene rubber having maleic anhydride group introduced therein (maleic anhydride group-containing IR). The proportion of the maleic anhydride group introduced in the obtained maleic anhydride group-containing IR was 3.0 mol % to isoprene unit.

The maleic anhydride group-containing IR obtained above was reacted with methanol in the presence of pyridine catalyst to obtain an isoprene rubber having carboxyl group introduced therein (carboxyl group-containing IR).

1,4-Butane diol divinyl ether 4.91 g (69.1 mmol) and Irganox 1520 2.77 g (2 wt % of the whole) were added to the obtained carboxyl group-containing IR 134.3 g (69.1 mmol), and the resulting mixture was mixed by stirring with a kneader under the conditions of 180° C., 60 rpm and 10 minutes to obtain thermo-reversible, crosslinkable elastomer (2) (hemiacetal ester-formed rubber).

Example 3

Synthesis of Thermo-reversible, Crosslinkable Elastomer (3) (Ionene-formed Rubber)

Tetramethylhexane diamine 5.94 g was added to halogenated alkyl-containing butyl rubber (Exxpro 89-1, a product of Exxon Chemical Japan Ltd., bromine content 1.2 wt %) 459 g (68.94 mmol), and the resulting mixture was mixed by stirring with a kneader under the conditions of 120° C., 60 rpm and 20 minutes to obtain thermo-reversible, crosslinkable elastomer (3) (ionene-formed rubber).

Example 4

Synthesis of Thermo-reversible, Crosslinkable Elastomer (4) (Urethane-formed Rubber)

Isoprene rubber (Nipol IR-2200) 200 g was dissolved in xylene 2 liters, and 4-mercaptophenol 126 g (1.0 mol) was added thereto. The resulting mixture was stirred at 140° C. for 20 hours to conduct reaction. The reaction solution was precipitated in methanol, and the precipitate was dried under reduced pressure to obtain an isoprene rubber having phenolic hydroxyl group introduced therein (phenolic hydroxyl group-containing IR). The proportion of the phenolic hydroxyl group introduced in the obtained phenolic hydroxyl group-containing IR was 3.0 mol % to isoprene unit.

Diphenylmethane diisocyanate 5.43 g was added to the obtained phenolic hydroxyl group-containing IR 100 g, and the resulting mixture was mixed by stirring with a kneader under the conditions of 120° C., 60 rpm and 20 minutes to obtain thermo-reversible, crosslinkable elastomer (4) (urethane-formed rubber).

Example 5

Synthesis of Thermo-reversible, Crosslinkable Elastomer (5) (Azlactone/phenol-added Rubber)

Phenolic hydroxyl group-containing IR was obtained in the same method as in Example 4.

Bisazlactone butane 6.08 g was added to the obtained phenolic hydroxyl group-containing IR 100 g, and the resulting mixture was mixed by stirring with a kneader under the conditions of 120° C., 60 rpm and 20 minutes to obtain thermo-reversible, crosslinkable elastomer (5) (azlactone/phenol-added rubber).

Example 6

Synthesis of Thermo-reversible, Crosslinkable Elastomer (6) (Nitroso Dimer-formed Rubber)

Isoprene rubber (Nipol IR-2200) 200 g was dissolved in chloroform 2 liters, and nitrosyl chloride 65.5 g (1.0 mmol) was added thereto. The resulting mixture was stirred at 0° C. for 20 hours to conduct reaction. The reaction solution was precipitated in methanol, and the precipitate was dried under reduced pressure to obtain an isoprene rubber having nitroso group introduced therein (nitroso dimer-formed rubber). The proportion of the nitroso group introduced in the obtained nitroso dimer-formed rubber was 4.0 mol % to isoprene unit.

2. Preparation of rubber compositions or the like using the thermo-reversible, crosslinkable elastomers (1) to (6) Using raw materials shown below in the respective weight ratios shown in Tables 1 and 2, rubber compositions of respective Examples and rubber compositions of respective Comparative Examples, shown in Tables 1 and 2 were obtained.

(1) Elastomer
  (a) Ester-formed rubber obtained above
  (b) Hemiacetal ester-formed rubber obtained above
  (c) Ionene-formed rubber obtained above
  (d) Urethane-formed rubber obtained above
  (e) Azlactone/phenol-added rubber obtained above
  (f) Nitroso dimer-formed rubber obtained above
  (g) SBR (styrene-butadiene rubber): Nipol 1502
  (h) IR (isoprene rubber): Nipol IR-2200
  (i) Halogenated alkyl-containing butyl rubber: Exxpro 89-1

(2) Compounding Agent
Carbon black: Showblack N339 HAF-HS, a product of Showa Cabot K.K.
Zinc white: Ginrei zinc white R, a product of Toho Zinc Co., Ltd.
Stearic acid: Bead stearic acid, a product of NOF Corporation
Sulfur: Oil-treated sulfur, a product of Karuizawa Seirensho
Vulcanization accelerator (N-cyclohexyl-2-benzothiazyl sulfenamide): Sanceler GM-PO, a product of Sanshin Chemical Co., Ltd.

3. Evaluation of Physical Properties
Physical properties of each rubber composition obtained above were evaluated.

(1) Flow Initiation Temperature
By heating under pressure of 10 MPa using a flow tester (Shimadzu CFT-500), temperature at which flowing is initiated from a capillary having a length of 10 mm and a diameter of 1 mm was measured.

(2) Tensile Test
Tensile strength (breaking strength, $T_3$) and elongation (breaking elongation, $E_3$) were measured according to the criteria of JIS K6251.

The results obtained are shown in Tables 1 and 2.

It is apparent that the rubber composition of the present invention shows rubber elasticity at room temperature, and tensile strength and elongation values similar to those of conventional rubber compositions, but flow initiation temperature is as high as 149–175° C., and thus easy processability and recycling property are excellent (Examples 1 to 13).

On the other hand, unvulcanized rubber compositions (Comparative Examples 1, 3 and 5) are poor in tensile strength and does not have heat resistance. Further, vulcanized rubber compositions (Comparative Examples 2, 4 and 6) are excellent in tensile strength and elongation, but do not fluidize by heating, making it impossible to recycle.

Example B

1. Synthesis of Thermo-reversible, Crosslinkable Elastomer (7) of the Present Invention Synthesis Example 1

Synthesis of EXA 90-10

3-Amino-1,2,4-triazole (a product of Nippon Carbide Industries Co., Inc.) 7.62 g (0.0906 mol) was added to isobutylene-p-bromomethylstyrene copolymer (Exxpro 90-10, a product of Exxon Chemical Japan Ltd.) 447 g (0.0906 mol to bromomethylstyrene skeleton), and the

TABLE 1

| | Comparative Example | | | | | | Example | | | |
|---|---|---|---|---|---|---|---|---|---|---|
| | 1 | 2 | 3 | 4 | 5 | 6 | 1 | 2 | 3 | 4 |
| Rubber composition Elastomer | | | | | | | | | | |
| SBR | 100 | 100 | | | | | | | | |
| IR | | | 100 | 100 | | | | | | |
| Halogenated alkyl-containing butyl rubber | | | | | 100 | 100 | | | | |
| Ester-formed rubber | | | | | | | 100 | 100 | | |
| Hemiacetal ester-formed rubber | | | | | | | | | 100 | |
| Ionene-formed rubber | | | | | | | | | | 100 |
| Urethane-formed rubber | | | | | | | | | | |
| Azlactone/phenol-added rubber | | | | | | | | | | |
| Nitroso dimer-formed rubber | | | | | | | | | | |
| Compounding agent | | | | | | | | | | |
| Carbon black | | 50 | | 50 | | 50 | | 50 | | |
| Zinc white | | 3 | | 3 | | 3 | | | | |
| Stearic acid | | 1 | | 1 | | 1 | | | | |
| Sulfur | | 2.1 | | 2.1 | | 2.1 | | | | |
| Vulcanization accelerator | | 1 | | 1 | | 1 | | | | |
| Physical properties | | | | | | | | | | |
| Flow initiation temperature (° C.) | 74 | — | 70 | — | 80 | — | 165 | 173 | 170 | 161 |
| $T_B$ (MPa) | 1.3 | 25.0 | 1.1 | 26.8 | 1.5 | 8.9 | 16.5 | 18.2 | 18.2 | 6.9 |
| $E_B$ (%) | 647 | 380 | 780 | 557 | 650 | 950 | 410 | 395 | 495 | 980 |

TABLE 2

| | 5 | 6 | 7 | 8 | 9 | 10 | 11 | 12 | 13 |
|---|---|---|---|---|---|---|---|---|---|
| Rubber composition Elastomer | | | | | | | | | |
| SBR | | | | 10 | 10 | 10 | 10 | 10 | 10 |
| IR | | | | 10 | 10 | 10 | 10 | 10 | 10 |
| Halogenated alkyl-containing butyl rubber | | | | | | | | | |
| Ester-formed rubber | | | | 100 | | | | | |
| Hemiacetal ester-formed rubber | | | | | 100 | | | | |
| Ionene-formed rubber | | | | | | 100 | | | |
| Urethane-formed rubber | 100 | | | | | | 100 | | |
| Azlactone/phenol-added rubber | | 100 | | | | | | 100 | |
| Nitroso dimer-formed rubber | | | 100 | | | | | | 100 |
| Compounding agent | | | | | | | | | |
| Carbon black | | | | | | | | | |
| Zinc white | | | | | | | | | |
| Stearic acid | | | | | | | | | |
| Sulfur | | | | | | | | | |
| Vulcanization accelerator | | | | | | | | | |
| Physical properties | | | | | | | | | |
| Flow initiation temperature (° C.) | 170 | 175 | 150 | 165 | 160 | 149 | 161 | 163 | 136 |
| $T_B$ (MPa) | 18.2 | 15.2 | 16.2 | 17.2 | 18 | 7.9 | 16.9 | 14.8 | 15.2 |
| $E_B$ (%) | 495 | 695 | 595 | 435 | 455 | 880 | 485 | 665 | 615 | resulting mixture was stirred with a pressurizing kneader under heating at 100° C. for 10 minutes to obtain a thermo-reversible, crosslinkable elastomer of the present invention. Disappearance of peak of bromomethyl group around 4.5 ppm was confirmed by NMR.

Synthesis Example 2

Synthesis of EXA 89-1

3-Amino-1,2,4-triazole (a product of Nippon Carbide Industries Co., Inc.) 6.18 g (0.0736 mol) was added to isobutylene-p-bromomethylstyrene copolymer (Exxpro 89-1, a product of Exxon Chemical Japan Ltd.) 490 g (0.0736 mol to bromomethylstyrene skeleton), and the resulting mixture was stirred with a pressurizing kneader under heating at 100° C. for 10 minutes to obtain a thermo-reversible, crosslinkable elastomer of the present invention. Disappearance of peak of bromomethyl group around 4.5 ppm was confirmed by NMR.

Synthesis Example 3

Synthesis of BIA

3-Amino-1,2,4-triazole (a product of Nippon Carbide Industries Co., Inc.) 10.77 g (0.128 mol) was added to brominated butyl rubber (Bromobutyl X2, a product of Polysar Corporation) 512 g (0.128 mol to bromine atom), and the resulting mixture was stirred with a pressurizing kneader under heating at 100° C. for 20 minutes to obtain a thermo-reversible, crosslinkable elastomer of the present invention. Disappearance of peak of bromomethyl group around 4.3 ppm was confirmed by NMR.

Synthesis Example 4

Synthesis of TEA

A mixture of isobutylene oligomer having both ends terminated with hydroxyl group (a sample of Kaneka Corporation) 139.22 g (0.05 mol to hydroxyl group) and TDI (a product of Sumitomo Bayer Urethane Co., Ltd.) 8.73 g (0.05 mol) was stirred under heating at 80° C. for 8 hours. The composition thus obtained had NCO group content of 1.24 mass % (theoretical value 1.42 mass %). 3-Amino-1,2,4-triazole (a product of Nippon Carbide Industries Co., Inc.) 4.21 g (0.05 mol) was added to the composition, and the resulting mixture was stirred with a pressurizing kneader under heating at 150° C. for 1 hour to obtain a thermo-reversible, crosslinkable elastomer of the present invention. It was confirmed that the obtained thermo-reversible, crosslinkable elastomer had NCO group content of 0 mass % (theoretical value 0 mass %).

Synthesis Example 5

Synthesis of MPA

A mixture of polypropylene glycol having both ends terminated with hydroxyl group (Excenol 5030, a product of Asahi Glass Co., Ltd.) 804.8 g (0.4716 mol to hydroxyl group) and MDI (a product of Sumitomo Bayer Urethane Co., Ltd.) 117.9 g (0.4716 mol) was stirred under heating at 80° C. for 10 hours. The composition thus obtained had NCO group content of 2.03 mass % (theoretical value 2.14 mass %). 3-Amino-1,2,4-triazole (a product of Nippon Carbide Industries Co., Inc.) 39.65 g (0.4716 mol) was added to the composition, and the resulting mixture was stirred with a pressurizing kneader under heating at 150° C. for 1 hour to obtain a thermo-reversible, crosslinkable elastomer of the present invention. It was confirmed that the obtained thermo-reversible, crosslinkable elastomer had NCO group content of 0 mass % (theoretical value 0 mass %).

Synthesis Example 6

Synthesis of TPA

A mixture of polypropylene glycol having both ends terminated with hydroxyl group (Excenol 5030) 468.45 g (0.2745 mol to hydroxyl group) and TDI (a product of Sumitomo Bayer Urethane Co., Ltd.) 47.81 g (0.2745 mol) was stirred under heating at 80° C. for 6 hours. The composition thus obtained had NCO group content of 2.00 mass % (theoretical value 2.24 mass %). 3-Amino-1,2,4-triazole (a product of Nippon Carbide Industries Co., Inc.) 23.08 g (0.2745 mol) was added to the composition, and the resulting mixture was stirred with a pressurizing kneader under heating at 150° C. for 1 hour to obtain a thermo-reversible, crosslinkable elastomer of the present invention. It was confirmed that the obtained thermo-reversible, crosslinkable elastomer had NCO group content of 0 mass % (theoretical value 0 mass %).

Synthesis Example 7

Synthesis of MTA

A mixture of polytetramethylene glycol having both ends terminated with hydroxyl group (a product of Kanto Chemical Co., Inc.) 423.82 g (0.4343 mol to hydroxyl group) and MDI (a product of Sumitomo Bayer Urethane Co., Ltd.) 108.58 g (0.4343 mol) was stirred under heating at 80° C. for 2 hours. The composition thus obtained had NCO group content of 3.24 mass % (theoretical value 3.42 mass %). 3-Amino-1,2,4-triazole (a product of Nippon Carbide Industries Co., Inc.) 36.5 g (0.4343 mol) was added to the composition, and the resulting mixture was stirred with a pressurizing kneader under heating at 150° C. for 1 hour to obtain a thermo-reversible, crosslinkable elastomer of the present invention. It was confirmed that the thermo-reversible, crosslinkable elastomer had NCO group content of 0 mass % (theoretical value 0 mass %).

Synthesis Example 8

Synthesis of LMT

Liquid isoprene rubber (LIR-50, a product of Kuraray Co., Ltd.) 3.48 g (0.0512 mol to isoprene unit) and 4-methyl-1,2,4-triazoline-3,5-dione (a product of Otsuka Chemical Co., Ltd.) 0.63 g (5.57 mmol) were dissolved in tetrahydrofuran (THF) 35 ml, and the resulting mixture was stirred at room temperature for 40 hours. It was confirmed by NMR that 4-methyl-1,2,4-triazoline-3,5-dione was introduced in an amount of 3.2 mol % per butadiene unit of the liquid isoprene rubber.

Synthesis Example 9

Synthesis of LPT

Liquid isoprene rubber (LIR-50, a product of Kuraray Co., Ltd.) 5.83 g (0.0857 mol to isoprene unit) and 4-phenyl-1,2,4-triazoline-3,5-dione (a product of Otsuka Chemical Co., Ltd.) 1.5 g (8.56 mmol) were dissolved in THF 50 ml, and the resulting mixture was stirred at room temperature for 40 hours. It was confirmed by NMR that 4-phenyl-1,2,4-triazoline-3,5-dione was introduced in an amount of 3.6 mol % per butadiene unit of the liquid isoprene rubber.

2. Preparation of Rubber Composition

Examples 15, 16, 18, 19, 21, 22, 24, 26, 28, 30, 32, 34 and 36

Using the raw materials shown below in the respective mass ratios shown in Tables 3 and 4, a rubber composition of each Example shown in Tables 3 and 4 was obtained.

EXA90-10: Thermo-reversible, crosslinkable elastomer (7) obtained in Synthesis Example 1

EXA 89-1: Thermo-reversible, crosslinkable elastomer (7) obtained in Synthesis Example 2

BIA: Thermo-reversible, crosslinkable elastomer (7) obtained in Synthesis Example 3

TEA: Thermo-reversible, crosslinkable elastomer (7) obtained in Synthesis Example 4

MPA: Thermo-reversible, crosslinkable elastomer (7) obtained in Synthesis Example 5

TPA: Thermo-reversible, crosslinkable elastomer (7) obtained in Synthesis Example 6

MTA: Thermo-reversible, crosslinkable elastomer (7) obtained in Synthesis Example 7

LMT: Thermo-reversible, crosslinkable elastomer (7) obtained in Synthesis Example 8

LPT: Thermo-reversible, crosslinkable elastomer (7) obtained in Synthesis Example 9

Aroma oil: Dezorex No. 3, a product of Showa Shell Sekiyu K.K.

Carbon black: Showblack N-339, a product of Showa Cabot K.K.

Silica: Nip Seal AQ, a product of Nippon Silica Industrial Co., Ltd.

3. Physical Properties of Thermo-reversible, Crosslinkable Elastomer (7) and Rubber Composition Physical properties of each thermo-reversible, crosslinkable elastomer (7) and each rubber composition obtained above were evaluated. In Examples 14, 17, 20, 23, 25, 27, 29, 31, 33 and 35, the thermo-reversible, crosslinkable elastomer (7) was used as it was without adding any additive. In Comparative Examples 7 and 8, the following BIMSs (isobutylene-p-bromomethylstyrene copolymer) were used, respectively, as they were without adding any additive.

Comparative Example 7

BIMS1: Isobutylene-p-bromomethylstyrene copolymer (Exxpro 90-10)

Comparative Example 8

BIMS2: Isobutylene-p-bromomethylstyrene copolymer (Exxpro 89-1)

(1) Tensile Test

Tensile strength (breaking strength) and elongation (breaking elongation) were measured according to the criteria of JIS K6251.

(2) Flow Initiation Temperature

By heating under pressure of 10 MPa using a flow tester (Shimadzu CFT-500), temperature at which flowing is initiated from a capillary having a length of 10 mm and a diameter of 1 mm was measured.

(3) Thermo-reversible Crosslinkability

In the case where a process of melting the samples by hot press at 190° C. and then cooling them to room temperature was repeated, it was observed how many times the process could be repeated before the appearance of the samples was deteriorated. The thermo-reversible crosslinkability was evaluated as good (○) when the repeating number was 3 or more.

Physical properties of the thermo-reversible, crosslinkable elastomer (7) and rubber composition are shown in Tables 3 and 4.

It is apparent that the thermo-reversible, crosslinkable elastomer (7) of the present invention and the rubber composition of the present invention containing the same can reversibly cause formation and dissociation of the crosslinked structure by temperature change, and they develop sufficient rubber properties at low temperature and on the other hand show excellent flowability when heated at high temperature (Examples 14 to 36).

On the other hand, in the case of not having nitrogen-containing heterocycle capable of forming hydrogen bond between other nitrogen-containing heterocycles (Comparative Examples 7 and 8), the thermo-reversible crosslinkability (thermoplasticity) is shown, but due to uncrosslinking, strength is poor.

TABLE 3

|  | Example | | | | | | | | | Comparative Example | |
|---|---|---|---|---|---|---|---|---|---|---|---|
|  | 14 | 15 | 16 | 17 | 18 | 19 | 20 | 21 | 22 | 7 | 8 |
| Rubber composition | | | | | | | | | | | |
| BIMS1 EXA90-10 | 100 | 100 | 100 | | | | | | | 100 | |
| BIMS2 EXA89-1 | | | | 100 | 100 | 100 | 100 | 100 | 100 | | 100 |
| Aroma oil | | | | | | | 10 | 10 | 10 | | |
| Carbon black | | 20 | | | 20 | | | 20 | | | |
| Silica | | | 20 | | | 20 | | | 20 | | |
| Physical Properties | | | | | | | | | | | |
| Heat reversible Crosslinkability | ○ | ○ | ○ | ○ | ○ | ○ | ○ | ○ | ○ | ○ | ○ |
| Breaking strength (MPa) | 0.55 | 0.81 | 1.15 | 0.43 | 0.65 | 0.87 | 0.38 | 0.51 | 0.78 | 0.32 | 0.27 |
| Breaking elongation (%) | 700 | 600 | 530 | 400 | 400 | 300 | 400 | 500 | 400 | no breakage | 300 |
| Flow initiating temperature (° C.) | 70.5 | 72.3 | 73.3 | 77.4 | 78.6 | 80.2 | 74.6 | 85.5 | 85.9 | 66.5 | 74.3 |

TABLE 4

| | Example | | | | | | | | | | | | | |
|---|---|---|---|---|---|---|---|---|---|---|---|---|---|---|
| | 23 | 24 | 25 | 26 | 27 | 28 | 29 | 30 | 31 | 32 | 33 | 34 | 35 | 36 |
| Rubber composition | | | | | | | | | | | | | | |
| BIA | 100 | 100 | | | | | | | | | | | | |
| TEA | | | 100 | 100 | | | | | | | | | | |
| MPA | | | | | 100 | 100 | | | | | | | | |
| TPA | | | | | | | 100 | 100 | | | | | | |
| MTA | | | | | | | | | 100 | 100 | | | | |
| LMT | | | | | | | | | | | 100 | 100 | | |
| LPT | | | | | | | | | | | | | 100 | 100 |
| Carbon black | | 20 | | 20 | | 20 | | 20 | | 20 | | 20 | | 20 |
| Physical Properties | | | | | | | | | | | | | | |
| Heat reversible Crosslinkability | ○ | ○ | ○ | ○ | ○ | ○ | ○ | ○ | ○ | ○ | ○ | ○ | ○ | ○ |
| Breaking strength (MPa) | 0.75 | 1.01 | 0.44 | 0.74 | 0.84 | 1.04 | 0.74 | 0.94 | 1.02 | 1.34 | 0.27 | 0.43 | 0.35 | 0.47 |
| Breaking elongation (%) | 700 | 600 | 350 | 250 | 400 | 350 | 400 | 350 | 350 | 400 | 600 | 500 | 600 | 550 |
| Flow initiating temperature (° C.) | 62.2 | 65.8 | 55.5 | 65.5 | 75.5 | 80.9 | 68.5 | 76.2 | 80.5 | 84.9 | 54.3 | 65.2 | 61.2 | 78.6 |

Example C

1. Synthesis of Thermo-reversible, Crosslinkable Elastomer (8) of the Present Invention Thermo-reversible, crosslinkable elastomer (8) having, as side chains, an aromatic ring having a substituent in which σ is a positive value, and an aromatic ring having a substituent in which σ is a negative value was synthesized.

Synthesis Example 10

Synthesis of Thermo-reversible, Crosslinkable Elastomer (8a)

N,N-dimethyl-p-phenylenediamine (a product of Tokyo Kasei Kogyo Co., Ltd.) 0.599 g (4.4 mmol) was added to commercially available maleic anhydride-modified isoprene rubber (modification rate 2.7 mol %, LIR-410A, a product of Kuraray Co., Ltd.) 17.10 q (8.8 mmol), and the resulting mixture was stirred at 130° C. for 3 hours.

4-Aminobenzonitrile (a product of Tokyo Kogyo Co., Ltd.) 0.52 g (4.4 mmol) was added to the reaction product, and the resulting mixture was stirred at 130° C. for 3 hours. After confirming that the resulting mixture became homogenous, the resulting mixture was allowed to stand overnight to obtain a gel-like reaction product. It was confirmed by NMR and IR that the reaction product was thermo-reversible, crosslinkable elastomer (8a) having the following model structure.

Using the corresponding compound in the same proportion, thermo-reversible, crosslinkable elastomers (8b) to (8e) were synthesized in the same method as above.

As a comparison compound, a thermoplastic elastomer (a) was obtained by reacting the above-described maleic anhydride-modified isoprene rubber 15.56 g (8.01 mmol) and N,N-dimethyl-p-phenylenediamine 1.09 g (8.01 mmol).

A thermoplastic elastomer (b) was obtained in the same method as in the thermoplastic elastomer (a) except that 4-aminobenzonitrile was used in the same proportion in place of N,N-dimethyl-p-phenylenediamine.

A thermoplastic elastomer (C) was obtained in the same method as in the thermoplastic elastomer (a) except for using p-aminoacetophenone in the same proportion in place of N,N-dimethyl-p-phenylenediamine.

Model structures of the obtained thermo-reversible, crosslinkable elastomers (8a) to (8e) and thermoplastic elastomers (a) to (c) are as follows.

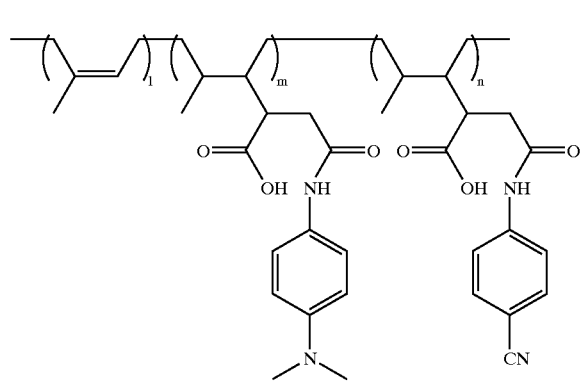

THERMO-REVERSIBLE, CROSSLINKABLE ELASTOMER (8a)

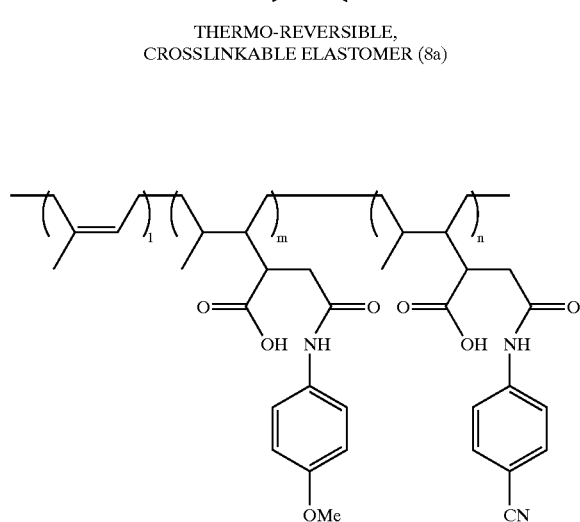

THERMO-REVERSIBLE, CROSSLINKABLE ELASTOMER (8b)

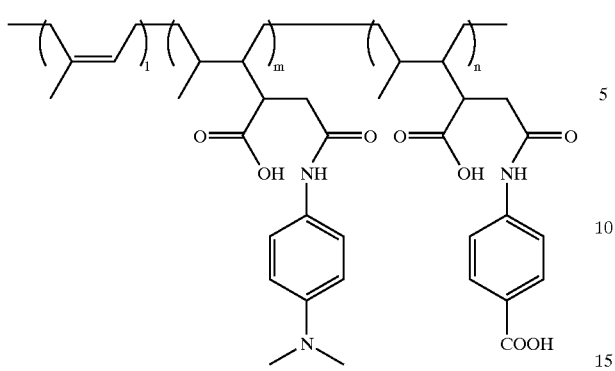

THERMO-REVERSIBLE, CROSSLINKABLE ELASTOMER (8c)

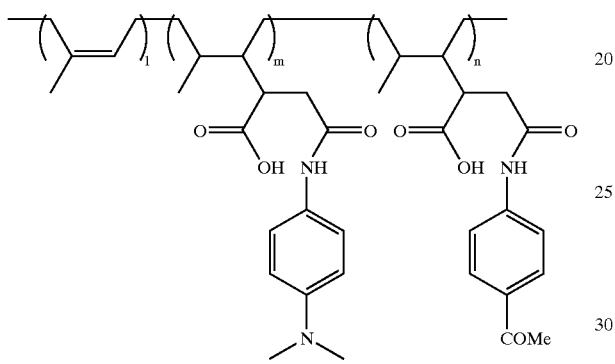

THERMO-REVERSIBLE, CROSSLINKABLE ELASTOMER (8d)

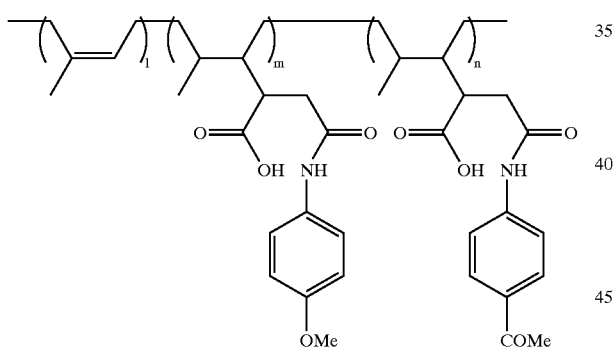

THERMO-REVERSIBLE, CROSSLINKABLE ELASTOMER (8e)

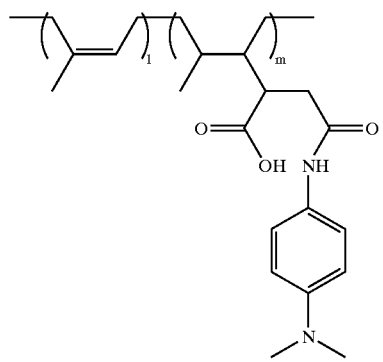

THERMOPLASTIC ELASTOMER (a)

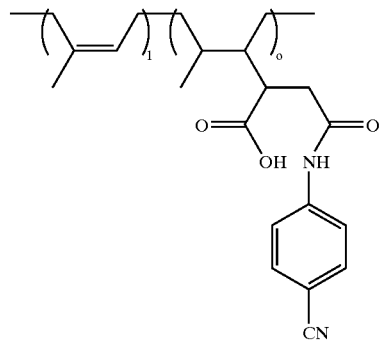

THERMOPLASTIC ELASTOMER (b)

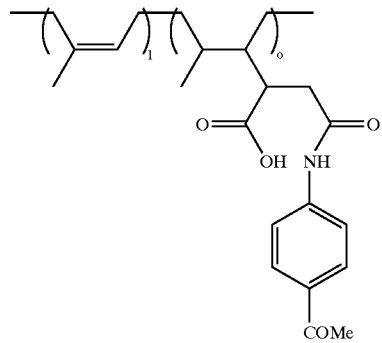

THERMOPLASTIC ELASTOMER (c)

In the above structural formulae, $l:m:n \cong 97.3:1.35:1.35$ and $l:o \cong 97.3:2.7$.

2. Physical Properties of Thermo-reversible, Crosslinkable Elastomer (8)

Examples 37 to 41

The thermo-reversible, crosslinkable elastomers (8a) to (8e) obtained were subjected to measurement by JIS Hardness A, and the state at 120° C. heating was observed. The measurement method of JIS Hardness A is explained after.

Comparative Examples 9 to 11

JIS Hardness A and the state at 120° C. heating were observed on the thermoplastic elastomers (a) to (c) in the same method as in Examples 37 to 41.

The results obtained are shown in Table 5.

(JIS Hardness)

The thermo-reversible, crosslinkable elastomers (8a) to (8e) obtained were press molded at 150° C. for 60 minutes to obtain the respective plane plate samples each having a size of 1 (thickness)×5 (length)×5 (width) cm. Three plates were piled for each sample, and JIS Hardness A thereof was measured at room temperature in accordance with JIS K6253.

TABLE 5

|  | Example | | | | | Comparative Example | | |
| --- | --- | --- | --- | --- | --- | --- | --- | --- |
|  | 37 | 38 | 39 | 40 | 41 | 9 | 10 | 11 |
| Heat reversible, crosslinkable elastomer | 8a | 8b | 8c | 8d | 8e |  |  |  |
| Thermoplastic elastomer |  |  |  |  |  | a | b | c |
| JIS Hardness A | 15 | 13 | 12 | 10 | 13 | Liquid | Liquid | Liquid |
| State at 120° C. heating | Liquid | Liquid | Liquid | Liquid | Liquid | Liquid | Liquid | Liquid |

The thermoplastic elastomer (8) having, as side chains, an aromatic ring having a substituent in which σ is a positive value, and a nitrogen-containing heterocycle was synthesized.

Synthesis Example 11

Synthesis of Thermo-reversible, Crosslinkable Elastomer (8f)

4-Aminobenzoic acid (ABA, a product of Tokyo Kasei Kogyo Co., Ltd.) 0.766 g (5.585 mmol) was added to commercially available maleic anhydride-modified isoprene rubber (modification rate 2.70 mol %, LIR-410A, a product of Kuraray Co., Ltd.) 16.2857 g (8.382 mmol), and the resulting mixture was stirred under heating at 130° C. for 2 hours. After confirming that the mixture became homogenous, the mixture was allowed to stand overnight to obtain a gel-like reaction product.

3-Amino-1,2,4-triazole (ATA, a product of Nippon Carbide Industries Co., Inc.) 0.2349 g (2.79 mmol) was added to the reaction product, and the resulting mixture was stirred under heating at 160° C. for 3 hours. After confirming that the mixture became uniform, the mixture was allowed to stand overnight to obtain a gel-like reaction product. It was confirmed by NMR and IR that the reaction product was a thermo-reversible, crosslinkable elastomer (8f) having the following model structure.

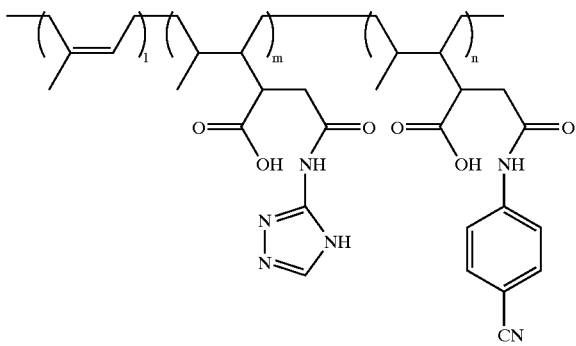

THERMO-REVERSIBLE, CROSSLINKABLE ELASTOMER (8f)

In the above formula, $l:m:n \cong 97.3:1.35:1.35$.

Thermo-reversible, crosslinkable elastomers (8g) to (8l) were synthesized in the same method as above by changing the mixing ratio of 4-aminobenzoic acid, 3-amino-1,2,4-triazole, 4-aminopyridine (4AP, a product of Tokyo Kasei Kogyo Co., Ltd.), and 3-aminopyridine (3AP, a product of Tokyo Kasei Kogyo Co., Ltd.). The value of $(m+n)/(l+m+n)$ in the thermo-reversible, crosslinkable elastomer (8f) can also apply to the thermo-reversible, crosslinkable elastomers (8f) to (8l). Mixing molar ratios of raw materials of each of thermo-reversible, crosslinkable elastomers (8f) to (8l) are shown in Table 6.

As a comparison compound, a thermoplastic elastomer (d) was obtained by reacting the above-described maleic anhydride-modified isoprene rubber 16.28 g (8.379 mmol) and 4-aminobenzoic acid 1.149 q (8.379 mmol).

Further, a thermoplastic elastomer (e) was obtained in the same method as in the thermoplastic elastomer (d) using 4-aminopyridine in the same proportion in place of 4-aminobenzoic acid.

Examples 42 to 48

JIS Hardness A measurement was made and observation of the state at 120° C. heating was made on the thermo-reversible, crosslinkable elastomers (8f) to (8l) obtained. The measurement method of JIS Hardness A is the same as described before.

Comparative Examples 12 and 13

JIS Hardness A measurement was made and observation of the state at 120° C. heating was made on the obtained thermoplastic elastomers (d) and (e) in the same method as in Examples 42 to 48.

The results obtained are shown in Table 6.

TABLE 6

|  | Example | | | | | | | Comparative Example | |
| --- | --- | --- | --- | --- | --- | --- | --- | --- | --- |
|  | 42 | 43 | 44 | 45 | 46 | 47 | 48 | 12 | 13 |
| Heat reversible, | 8f | 8g | 8h | 8i | 8j | 8k | 8l |  |  |

TABLE 6-continued

| | Example | | | | | | | Comparative Example | |
|---|---|---|---|---|---|---|---|---|---|
| | 42 | 43 | 44 | 45 | 46 | 47 | 48 | 12 | 13 |
| crosslinkable elastomer | | | | | | | | d | e |
| Thermoplastic elastomer | | | | | | | | | |
| ATA (mol) | 3/1 | 1/2 | 2/3 | 0 | 0 | 0 | 0 | 0 | 0 |
| 4AP (mol) | 0 | 0 | 0 | 1/3 | 1/2 | 2/3 | 0 | 0 | 1 |
| ABA (mol) | 2/3 | 1/2 | 1/3 | 2/3 | 1/2 | 1/3 | 1/2 | 1 | 0 |
| 3AP (mol) | 0 | 0 | 0 | 0 | 0 | 0 | 1/2 | 0 | 0 |
| JIS Hardness A | 36 | 38 | 43 | 31 | 32 | 32 | 11 | Liquid | Liquid |
| State at 120° C. heating | Liquid | Liquid | Liquid | Liquid | Liquid | Liquid | Liquid | Liquid | Liquid |

As explained above, the thermo-reversible, crosslinkable elastomer of the present invention shows rubber elasticity due to formation of crosslinking at room temperature, shows flowability due to dissociation of crosslinking when heated to a certain temperature or higher, and rapidly forms crosslinked structure in the course of cooling after formation thereof. Dissociation and formation of the crosslinked structure can repeatedly be conducted, so that heat molding and recycle are easy, which is useful. The thermo-reversible, crosslinkable elastomer can be applied to various uses.

The rubber composition of the present invention contains the thermo-reversible, crosslinkable elastomer of the present invention. Therefore, the rubber composition shows the same properties as in the thermo-reversible, crosslinkable elastomer, and hence is useful.

The rubber-bonded body of the present invention shows the strength properties and heat resistance comparable to those of ordinary rubber single substance, and makes it possible to easily peel the rubber layer off the vulcanized rubber layer. Thus, the rubber-bonded body can provide recyclable products, and therefore is useful.

The rubber structure of the present invention can form any of rubber products in which rubber is used in at least a part thereof, in wide fields such as automobiles, aircraft, medical treatment and the like. In particular, the rubber structure is suitably used in tires in which recycling property is strongly required.

What is claimed is:

1. A method for adhering a first surface of a first product to a second surface of a second product using a thermo-reversible, crosslinkable elastomer comprising the steps of:
    applying the thermo-reversible, crosslinkable elastomer to the first surface of the first product;
    applying the thermo-reversible, crosslinkable elastomer to the second surface of the second product; and
    adhering the first surface of the first product to the second surface of the second product to form a bonded product;
    wherein the thermo-reversible, crosslinking elastomer capable of reversibly causing dissociation and formation of a crosslinked structure by temperature change in which a hydrogen bond reaction between nitrogen-containing heterocycles is utilized for crosslinking is used as an adhesive.

2. The method of claim 1, further comprising the steps of:
    heating the bonded product; and
    dissociating the first product from the second product.

3. A method for recycling a product, said product comprising:
    a first product and a thermo-reversible, crosslinking elastomer capable of reversibly causing dissociation and formation of a crosslinked structure by temperature change in which a hydrogen bond reaction between nitrogen-containing heterocycles is utilized for crosslinking;
    and comprising the step of:
        heating the product;
        whereby the first product can be dissociated from the thermo-reversible, crosslinking elastomer.

4. The method of recycling of claim 3, wherein the product comprises more then two layers and at least one layer is the thermo-reversible, crosslinking elastomer.

5. A method for recycling a product, said product having at least one thermo-reversible, crosslinking elastomer layer and at least one product layer, comprising the step of:
    heating the product;
    whereby the product layer can be dissociated from the thermo-reversible, crosslinking elastomer layer.

* * * * *